(12) United States Patent
Cohen et al.

(10) Patent No.: US 9,405,481 B1
(45) Date of Patent: Aug. 2, 2016

(54) REPLICATING USING VOLUME MULTIPLEXING WITH CONSISTENCY GROUP FILE

(71) Applicant: EMC Corporation, Hopkinton, MA (US)

(72) Inventors: Saar Cohen, Moshav Mishmeret (IL); Assaf Natanzon, Tel Aviv (IL); Anestis Panidis, Saratoga, CA (US); Kadir Ozdemir, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 47 days.

(21) Appl. No.: 14/572,899

(22) Filed: Dec. 17, 2014

(51) Int. Cl.
*G06F 12/00* (2006.01)
*G06F 3/06* (2006.01)

(52) U.S. Cl.
CPC .............. *G06F 3/0619* (2013.01); *G06F 3/065* (2013.01); *G06F 3/067* (2013.01); *G06F 3/0665* (2013.01)

(58) Field of Classification Search
CPC ....... G06F 3/0619; G06F 3/065; G06F 3/067; G06F 3/0665
See application file for complete search history.

(56) References Cited

U.S. PATENT DOCUMENTS

| | | | |
|---|---|---|---|
| 5,170,480 A | 12/1992 | Mohan et al. | |
| 5,249,053 A | 9/1993 | Jain | |
| 5,388,254 A | 2/1995 | Betz et al. | |
| 5,499,367 A | 3/1996 | Bamford et al. | |
| 5,526,397 A | 6/1996 | Lohman | |
| 5,864,837 A | 1/1999 | Maimone | |
| 5,879,459 A | 3/1999 | Gadgil et al. | |
| 5,990,899 A | 11/1999 | Whitten | |
| 6,042,652 A | 3/2000 | Hyun et al. | |
| 6,065,018 A | 5/2000 | Beier et al. | |
| 6,143,659 A | 11/2000 | Leem | |
| 6,148,340 A | 11/2000 | Bittinger et al. | |
| 6,174,377 B1 | 1/2001 | Doering et al. | |
| 6,174,809 B1 | 1/2001 | Kang et al. | |
| 6,203,613 B1 | 3/2001 | Gates et al. | |
| 6,260,125 B1 | 7/2001 | McDowell | |
| 6,270,572 B1 | 8/2001 | Kim et al. | |
| 6,272,534 B1 | 8/2001 | Guha | |
| 6,287,965 B1 | 9/2001 | Kang et al. | |
| 6,467,023 B1 | 10/2002 | DeKoning et al. | |
| 6,574,657 B1 | 6/2003 | Dickinson | |
| 6,621,493 B1 | 9/2003 | Whitten | |
| 6,804,676 B1 | 10/2004 | Bains, II | |
| 6,947,981 B2 | 9/2005 | Lubbers et al. | |
| 7,043,610 B2 | 5/2006 | Horn et al. | |

(Continued)

FOREIGN PATENT DOCUMENTS

EP    1154356    11/2001
WO    WO 00 45581 A3    8/2000

OTHER PUBLICATIONS

Gibson, "Five Point Plan Lies at the Heart of Compression Technology;" Apr. 29, 1991; p. 1.

(Continued)

*Primary Examiner* — Gurtej Bansal
(74) *Attorney, Agent, or Firm* — Daly, Crowley, Mofford & Durkee, LLP

(57) ABSTRACT

In one aspect, a method includes replicating a first volume to a consistency group (CG) file on a backup device. The method also includes replicating a second volume to the CG file concurrently with the replicating of the first volume, the first and second volumes being in a consistency group.

20 Claims, 18 Drawing Sheets

(56) References Cited

U.S. PATENT DOCUMENTS

| | | |
|---|---|---|
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,516,287 B2 | 4/2009 | Ahal et al. |
| 7,519,625 B2 | 4/2009 | Honami et al. |
| 7,519,628 B1 | 4/2009 | Leverett |
| 7,546,485 B2 | 6/2009 | Cochran et al. |
| 7,577,867 B2 | 8/2009 | Lewin et al. |
| 7,590,887 B2 | 9/2009 | Kano |
| 7,606,940 B2 | 10/2009 | Yamagami |
| 7,627,612 B2 | 12/2009 | Ahal et al. |
| 7,627,687 B2 | 12/2009 | Ahal et al. |
| 7,719,443 B1 | 5/2010 | Natanzon |
| 7,757,057 B2 | 7/2010 | Sangapu et al. |
| 7,774,565 B2 | 8/2010 | Lewin et al. |
| 7,797,358 B1 | 9/2010 | Ahal et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,849,361 B2 | 12/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Hellen et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,589,350 B1 * | 11/2013 | Lalonde ............ G06F 11/1451 707/639 |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 5,914,595 A1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,075,810 B2 * | 7/2015 | Banerjee ............ G06F 17/3007 |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 2002/0129168 A1 | 9/2002 | Kanai et al. |
| 2003/0048842 A1 | 3/2003 | Fourquin et al. |
| 2003/0061537 A1 | 3/2003 | Cha et al. |

(56) References Cited

U.S. PATENT DOCUMENTS

| | | | |
|---|---|---|---|
| 2003/0110278 | A1 | 6/2003 | Anderson |
| 2003/0145317 | A1 | 7/2003 | Chamberlain |
| 2003/0196147 | A1 | 10/2003 | Hirata et al. |
| 2004/0205092 | A1 | 10/2004 | Longo et al. |
| 2004/0250032 | A1 | 12/2004 | Ji et al. |
| 2004/0254964 | A1 | 12/2004 | Kodama et al. |
| 2005/0015663 | A1 | 1/2005 | Armangau et al. |
| 2005/0028022 | A1 | 2/2005 | Amano |
| 2005/0049924 | A1 | 3/2005 | DeBettencourt et al. |
| 2005/0172092 | A1 | 8/2005 | Lam et al. |
| 2005/0273655 | A1 | 12/2005 | Chow et al. |
| 2006/0031647 | A1 | 2/2006 | Hirakawa et al. |
| 2006/0047996 | A1 | 3/2006 | Anderson et al. |
| 2006/0064416 | A1 | 3/2006 | Sim-Tang |
| 2006/0107007 | A1 | 5/2006 | Hirakawa et al. |
| 2006/0117211 | A1 | 6/2006 | Matsunami et al. |
| 2006/0161810 | A1 | 7/2006 | Bao |
| 2006/0179343 | A1 | 8/2006 | Kitamura |
| 2006/0195670 | A1 | 8/2006 | Iwamura et al. |
| 2006/0212462 | A1 | 9/2006 | Hellen et al. |
| 2007/0055833 | A1 | 3/2007 | Vu et al. |
| 2007/0162513 | A1 | 7/2007 | Lewin et al. |
| 2007/0180304 | A1 | 8/2007 | Kano |
| 2007/0198602 | A1 | 8/2007 | Ngo et al. |
| 2007/0198791 | A1 | 8/2007 | Iwamura et al. |
| 2007/0220311 | A1 | 9/2007 | Lewin et al. |
| 2007/0266053 | A1 | 11/2007 | Ahal et al. |
| 2008/0082591 | A1 | 4/2008 | Ahal et al. |
| 2008/0082592 | A1 | 4/2008 | Ahal et al. |
| 2008/0082770 | A1 | 4/2008 | Ahal et al. |
| 2013/0304788 | A1* | 11/2013 | DeLuca .................. G06F 8/61 709/201 |

OTHER PUBLICATIONS

Soules, "Metadata Efficiency in Versioning File Systems:" 2003; pp. 1-16.
AIX System Management Concepts: Operating Systems and Devices; May 2000; pp. 1-280.
Soules at al.; "Metadata Efficiency in a Comprehensive Versioning File System:" May 2002; CMU-CS-02-145: School of Computer Science, Carnegie Mellon University, Pittsburgh, PA 15213; 33 pages.
Linux Filesystems; Sams Publishing; 2002; pp. 17-22 and 67-71.
Bunyan, "Muitiplexing in a BrightStor® ARCserve® Backup Release 11:" Mar. 2004; pp, 1-4.
Marks, "Network Computing:" Feb. 2, 2006; pp. 1-8.
Hill, "Network Computing;" Jun. 8, 2006; pp. 1-9.
Microsoft Computer Dictionary; 2002; Press Fifth Edition; 2 pages.
Retrieved from http://en.wikipedia.org/wiki/DEFLATE; DEFLATE; Jun. 19, 2008; pp. 1-6.
Retrieved from http://en.wikipedia.org/wiki/Huffman_coding; Huffman Coding; Jun. 8, 2008; pp. 1-11.
Retrieved from http:///en.wikipedia.org/wiki/LZ77; LZ77 and LZ78; Jun. 17, 2008; pp. 1-2.
Saar Cohen, at al.; "Providing Data Protection Using Point-In-Time Images From Multiple Types of Storage Devices," U.S. Appl. No. 14/559,031, filed Dec. 3, 2014 51 pages.
Assaf Natanzon, et al.; "Storing Snapshot Changes with Shapshots," U.S. Appl. No. 14/559,036, filed Dec. 3, 2014 31 pages.
U.S. Appl. No. 11/609,560 downloaded Jan. 7, 2015 265 pages.
U.S. Appl. No. 12/057,652 downloaded Jan. 7, 2015 296 pages.
U.S. Appl. No. 11/609,561 downloaded Jan. 7, 2015 219 pages.
U.S. Appl. No. 11/356,920 downloaded Jan. 7, 2015 272 pages.
U.S. Appl. No. 10/512,687 downloaded Jan. 7, 2015 Part 1 of 2; 300 pages.
U.S. Appl. No. 10/512,687 downloaded Jan. 7, 2015 Part 2 of 2; 254 pages.
U.S. Appl. No. 11/536,233 downloaded Jan. 7, 2015 256 pages.
U.S. Appl. No. 11/536,215 downloaded Jan. 7, 2015 172 pages.
U.S. Appl. No. 11/536,160 downloaded Jan. 7, 2015 230 pages.
U.S. Appl. No. 11/965,168 downloaded Jan. 7, 2015 222 pages.
U.S. Appl. No. 14/559,036 downloaded Jan. 12, 2015 82 pages.
U.S. Appl. No. 14/559,031 downloaded Jan. 12, 2015 122 pages.

* cited by examiner

REPLICATING USING VOLUME MULTIPLEXING WITH CONSISTENCY GROUP FILE

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by generating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes replicating a first volume to a consistency group (CG) file on a backup device. The method also includes replicating a second volume to the CG file concurrently with the replicating of the first volume, the first and second volumes being in a consistency group.

In another aspect, an apparatus includes electronic hardware circuitry configured to replicate a first volume to a consistency group (CG) file on a backup device and replicate a second volume to the CG file concurrently with the replicating of the first volume, the first and second volumes being in a consistency group.

In a further aspect, an article includes a non-transitory computer-readable medium that stores computer-executable instructions. The instructions cause a machine to replicate a first volume to a consistency group (CG) file on a backup device and replicate a second volume to the CG file concurrently with the replicating of the first volume, the first and second volumes being in a consistency group.

DETAILED DESCRIPTION

Figure 1:
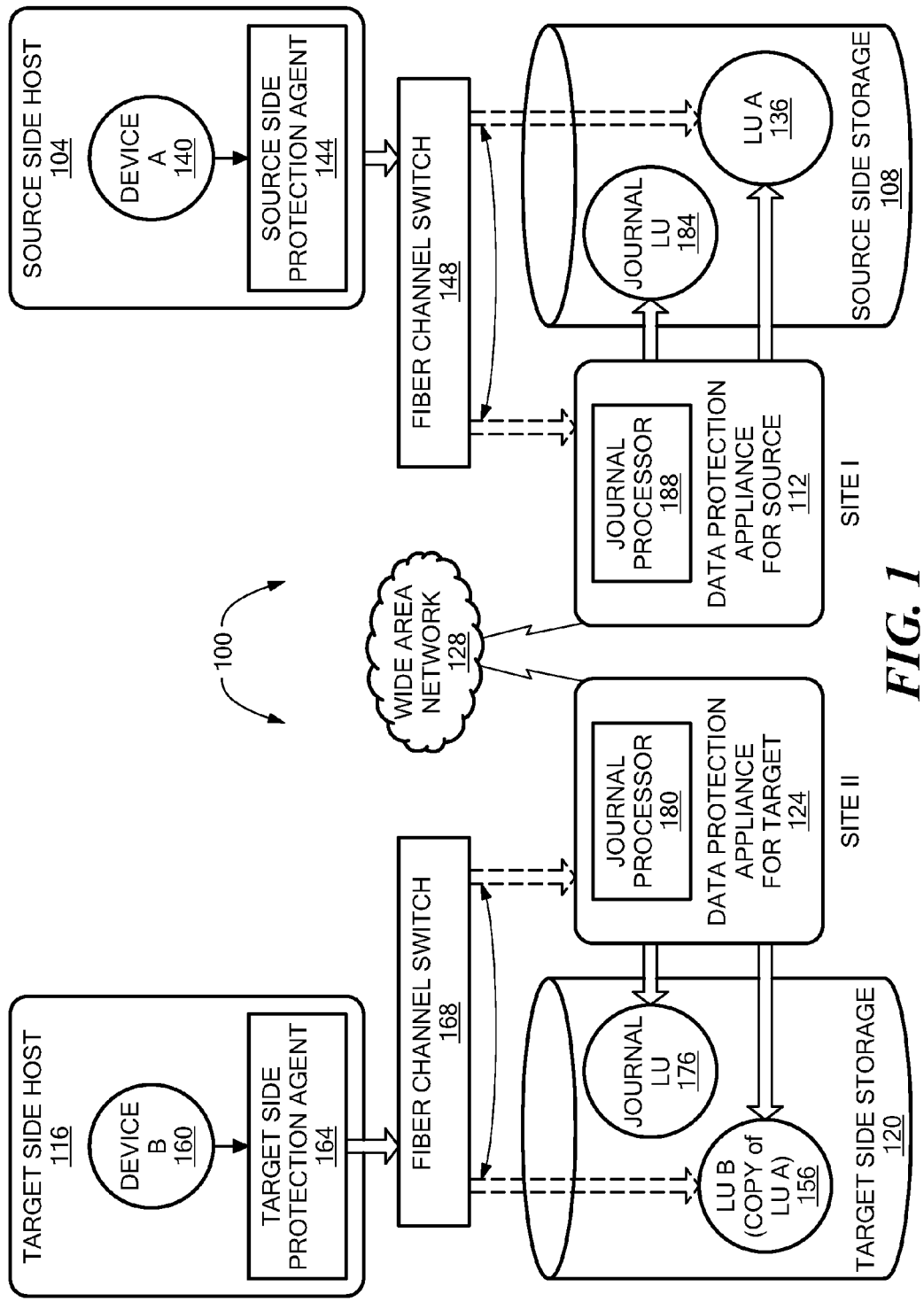
FIG. 1 is a block diagram of an example of a data protection system.

Described herein are techniques to perform continuous data protection using volume multiplexing.

The following definitions may be useful in understanding the specification and claims.

BACKUP SITE—a facility where replicated production site data is stored; the backup site may be located in a remote site or at the same location as the production site; a backup site may be a virtual or physical site.

BOOKMARK—a bookmark is metadata information stored in a replication journal which indicates a point in time.

CDP—Continuous Data Protection, a full replica of a volume or a set of volumes along with a journal which allows any point in time access, the CDP copy is at the same site, and maybe the same storage array of the production site.

DATA PROTECTION APPLIANCE (DPA)—a computer or a cluster of computers, or a set of processes that serve as a data protection appliance, responsible for data protection services including inter alia data replication of a storage system, and journaling of I/O requests issued by a host computer to the storage system. The DPA may be a physical device, a virtual device running, or may be a combination of a virtual and physical device.

DEDUPLICATED STORAGE SYSTEM—any storage system capable of storing deduplicated or space reduced data, and in some examples, is an EMC® DataDomain® system. Deduplicated data may also be any data that is processed to remove redundant data.

HOST—at least one computer or networks of computers that runs at least one data processing application that issues I/O requests to one or more storage systems; a host is an initiator with a SAN.

HOST DEVICE—an internal interface in a host, to a logical storage unit.

IMAGE—a copy of a logical storage unit at a specific point in time.

INITIATOR—a node in a SAN that issues I/O requests.

I/O REQUEST—an input/output request (sometimes referred to as an I/O or IO), which may be a read I/O request (sometimes referred to as a read request or a read) or a write I/O request (sometimes referred to as a write request or a write).

JOURNAL—a record of write transactions issued to a storage system; used to maintain a duplicate storage system, and to roll back the duplicate storage system to a previous point in time.

LOGICAL UNIT—a logical entity provided by a storage system for accessing data from the storage system. The logical disk may be a physical logical unit or a virtual logical unit.

LUN—a logical unit number for identifying a logical unit.

PHYSICAL LOGICAL UNIT—a physical entity, such as a disk or an array of disks, for storing data in storage locations that can be accessed by address.

PRODUCTION SITE—a facility where one or more host computers run data processing applications that write data to a storage system and read data from the storage system.

REMOTE ACKNOWLEDGEMENTS—an acknowledgement from remote DPA to the local DPA that data arrived at the remote DPA (either to the appliance or the journal).

SNAPSHOT—a snapshot is an image or differential representations of an image, i.e., the snapshot may have pointers to the original volume, and may point to log volumes for changed locations. Snapshots may be combined into a snapshot array, which may represent different images over a time period.

SPLITTER/PROTECTION AGENT—is an agent running either on a production host a switch or a storage array which can intercept Ms and split them to a DPA and to the storage array, fail Ms, redirect I/Os or do any other manipulation to the I/O; the splitter or protection agent may be used in both physical and virtual systems. The splitter may be in the I/O stack of a system and may be located in the hypervisor for virtual machines. In some examples, a splitter may be referred to as an Open Replicator Splitter (ORS).

SPLITTER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target.

SOURCE SIDE—a transmitter of data within a data replication workflow, during normal operation a production site is the source side; and during data recovery a backup site is the source side, sometimes called a primary side. Source side may be a virtual or physical site.

STORAGE SYSTEM—a SAN entity that provides multiple logical units for access by multiple SAN initiators.

STREAMING—transmitting data in real time, from a source to a destination, as the data is read or generated.

SYNTHESIZE—generating a new file, for example, using pointers from existing files, without actually copying the referenced data. In one particular example, a new file representing a volume at a points-in-time may be generated using pointers to a file representing a previous point-in-time, as well pointers to journal representing changes to the volume.

TARGET—a node in a SAN that replies to I/O requests.

TARGET SIDE—a receiver of data within a data replication workflow; during normal operation a back site is the target side, and during data recovery a production site is the target side, sometimes called a secondary side. The target side may be a virtual or physical site.

THIN PROVISIONING—thin provisioning involves the allocation of physical storage when it is needed rather than allocating the entire physical storage in the beginning Thus, use of thin provisioning is known to improve storage utilization.

THIN LOGICAL UNIT—a thin logical unit is a logical unit that uses thin provisioning.

VIRTUAL LOGICAL UNIT—a virtual storage entity which is treated as a logical unit by virtual machines.

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS generates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one example, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer generates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Figure 2:
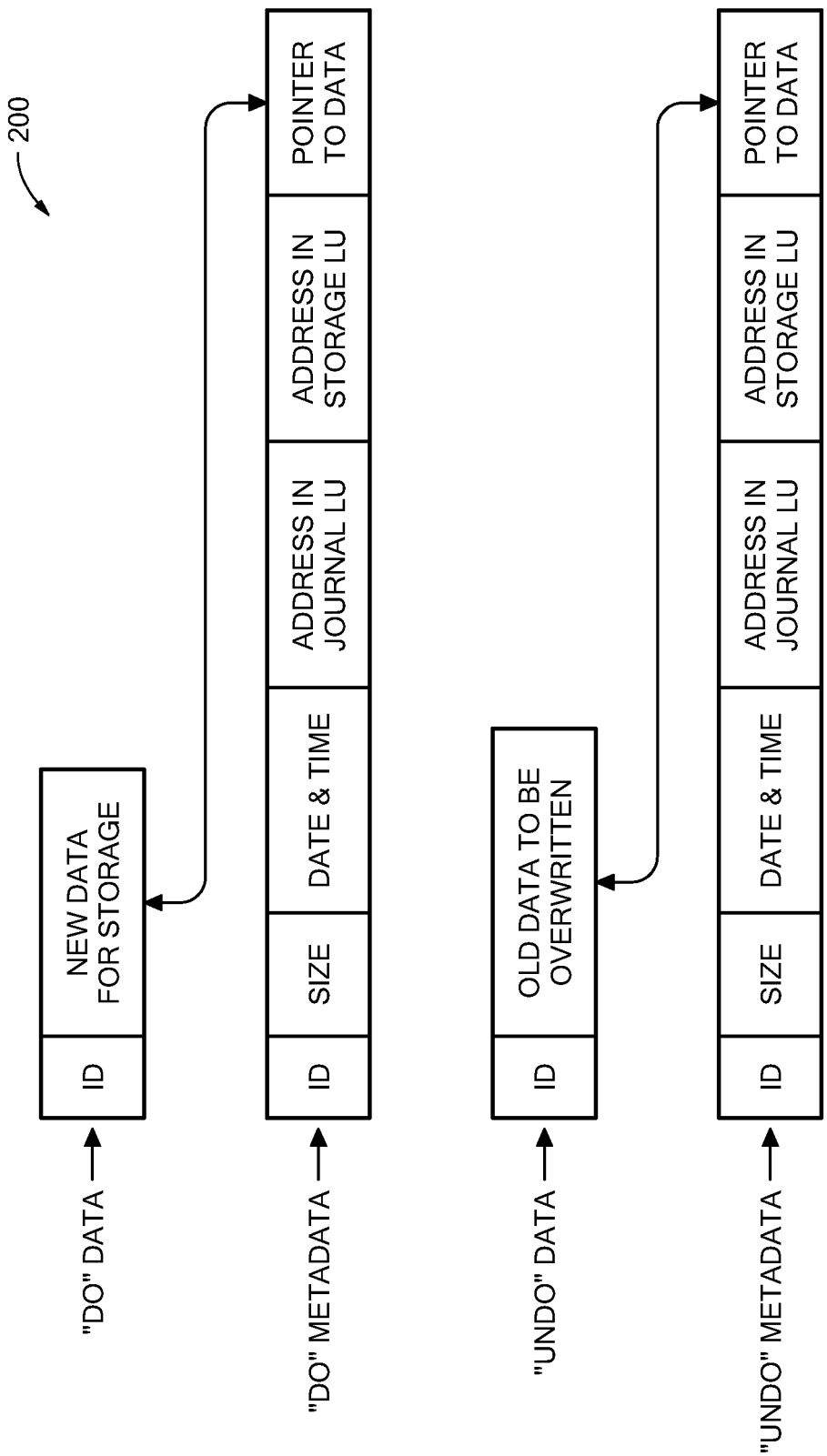
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal includes the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
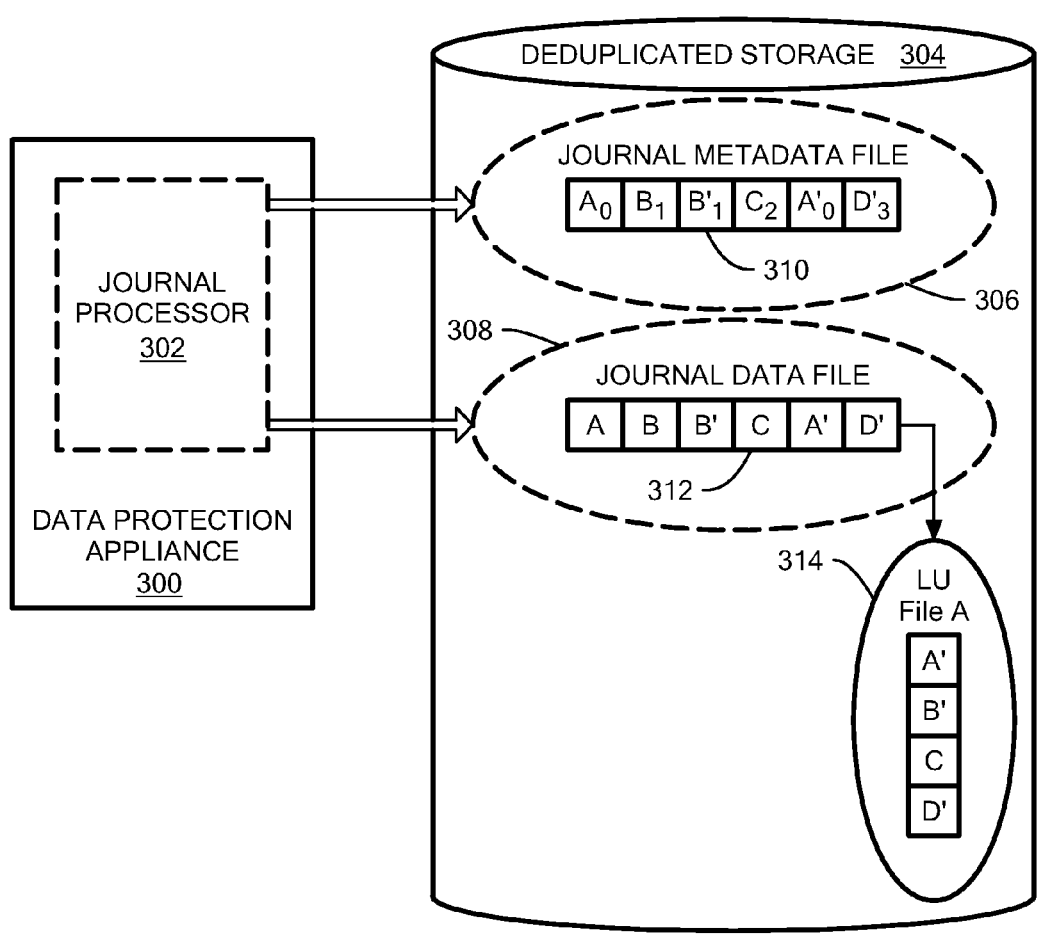
FIG. 3 is a block diagram of an example of a system to initialize a backup snapshot.
Figure 4:
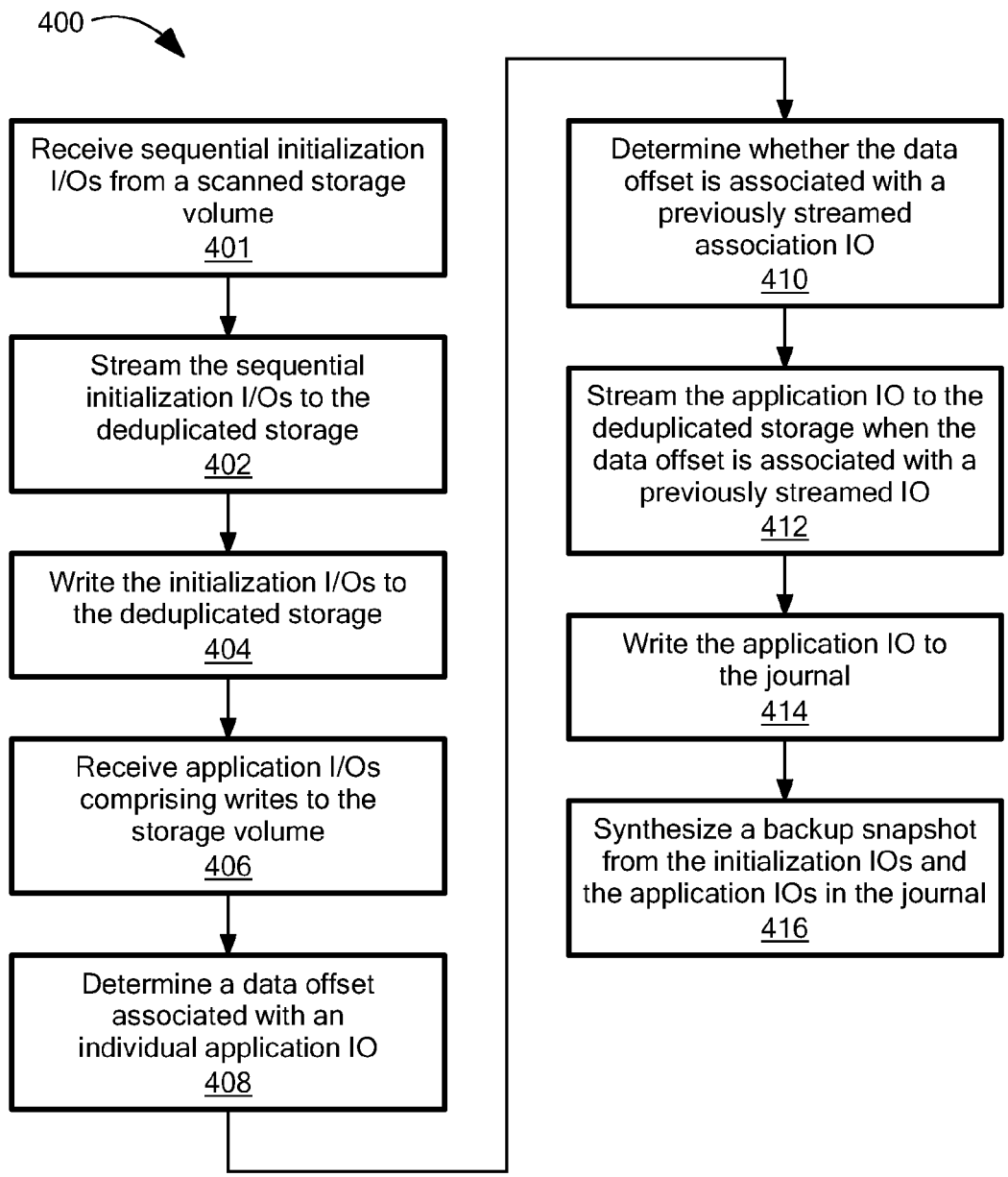
FIG. 4 is a flowchart of an example of a process to initialize a backup snapshot.
Figure 5:
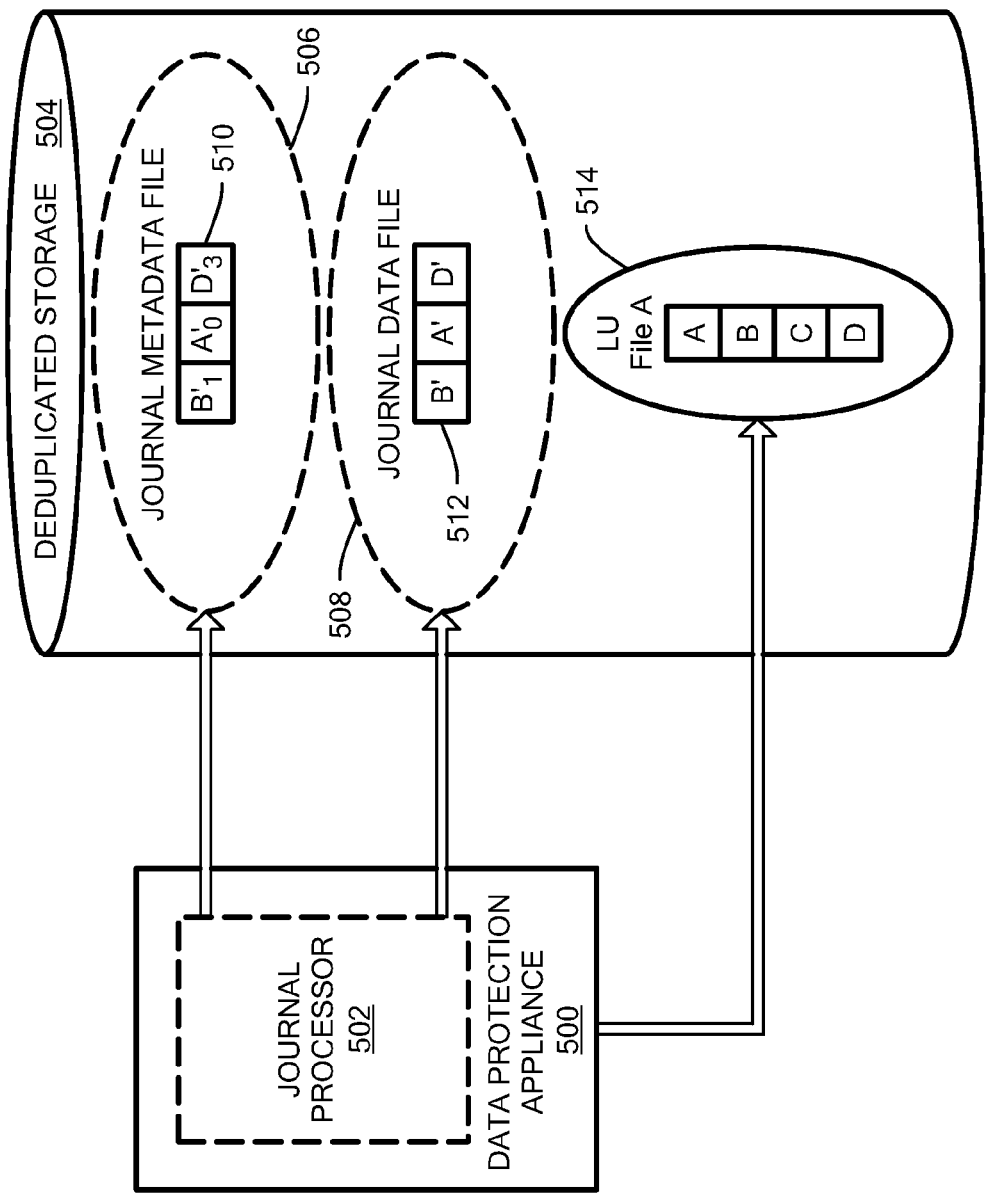
FIG. 5 is a block diagram of an example of a system to initialize a backup snapshot.

FIGS. 3 to 5 depict systems and processes for initializing a backup snapshot on deduplicated storage consistent. Before deduplicated storage can provide continuous backup protection, it may be necessary to generate an initial backup snapshot of the source storage system. This initial backup snapshot may represent the earliest point-in-time backup that may be restored. As changes are made to the source storage system, journal files and/or new backups may be updated and/or synthesized to provide continuous protection. In some examples, the initial backup snapshot may be generated by streaming I/Os from a storage system scan to a data protection appliance, or by taking an initial snapshot of the storage system and transmitting the entire snapshot to deduplicated storage.

FIG. 3 depicts a system for generating an initial backup snapshot by scanning a source storage system and streaming I/Os to the deduplicated storage. Data protection application 300 may include journal processor 302, and may be in communication with deduplicated storage 304. In one example, deduplicated storage 304 may be target side storage residing at a backup site. Data protection appliance 300 may be similar to data protection appliance 112 and/or 124, and may be responsible for streaming I/Os to deduplicated storage 304.

In one example, a source storage system may be scanned and individual offsets may be streamed to data protection appliance 300. The offsets streamed from the scanned system may be referred to as initialization I/Os, and may be streamed sequentially to data protection appliance 300. For example, the scanned system may include offsets 0, 1, 2, and 3, comprising data A, B, C, and D. The initial scan may start at the beginning of the system, and transmit offset 0, followed by offset 1, and so forth.

As data protection appliance 300 receives the initialization I/Os, journal processor 302 may identify the offset data and metadata, and may stream the I/Os to metadata journal 306 and/or data journal 308 residing on deduplicated storage 304. Data journal 308 may include data stored within an offset, and metadata 306 may include metadata associated with that offset. Metadata could include, for example, an offset identifier, size, write time, and device ID. These journals may then be used to synthesize a backup snapshot on deduplicated storage 304, as described herein.

In some examples, a scanned storage system may operate in a live environment. As a result, applications may be writing to the storage concurrently with the scan process. If an application writes to a location that has already been streamed, the journal files and ultimately the synthesized snapshot may be out of date. To address this issue, application I/Os may be streamed concurrently with the initialization I/Os if the application I/Os are to an offset that has already been scanned. For example, consider Table 1:

|        | Time |    |    |    |
|--------|------|----|----|----|
| Offset | t0   | t1 | t2 | t3 |
| 0      | A    |    |    | A' |
| 1      | B    | B' |    |    |
| 2      | C    |    |    |    |
| 3      | D    |    | D' |    |

Table 1 depicts four different offsets, denoted as 0, 1, 2, and 3, and four times, t0, t1, t2, and t3. Letters A, B, C, and D may represent the data stored at the offsets. Time t0 may represent the offsets as they exist when the scan begins. These offsets may be streamed to data protection appliance 300 sequentially from 0 to 3. At time t1, however, the data at offset 1 is modified by an application from B to B'. Similarly, at t2 the data at offset 3 changes from D to D', and at t3 the data at offset 0 changes from A to A'. If the scan transmits the data at offset 1 before t1, B' may be missed since the change occurred after offset 1 was scanned and B was transmitted. Similarly, if the scan has not reached offset 3 before t2, only D' will be transmitted since D no longer exists. It may therefore be beneficial to transmit application I/Os to data protection appliance 300 if those I/Os write to an offset that has already been scanned. If the offset has not been scanned, it may not be necessary to transmit the application I/Os because the change will be transmitted when the scan reaches that offset.

Referring back to FIG. 3 and with continued reference to Table 1, offset metadata journal entries 310 and offset data journal entries 312 depict the state of metadata journal 306 and data journal 308 after the initial scan is complete. While there are only four offsets on the scanned storage system, there are six entries in the journal because the data in offset 0 and 1 was modified by an application after they were scanned. They each therefore have two entries: B and B'. Segment D was modified after the scan began, but before it was reached. Segment D therefore only has one entry: D'.

Metadata journal entries 310 and data journal entries 312 may include all of the data necessary to synthesize a backup snapshot of the scanned storage system. Data journal entries 312 may include the actual data from the storage system: A, B, B' C, A' and D'. Note that data D is not in the data journal 308 since it was modified on the storage system before its offset was scanned and transmitted. Metadata journal entries 310 may include metadata about the offsets. For example, metadata journal entries 310 may include an offset identifier, offset length, and write time, and volume/device ID. In the present example, metadata journal entries may include the entries shown in Table 2:

| Offset/Time | Volume | Offset | Time |
|-------------|--------|--------|------|
| 0           | A      | 0      | t0   |
| 1           | A      | 8 kb   | t0   |
| 2           | A      | 8 kb   | t1   |
| 3           | A      | 16 kb  | t0   |
| 4           | A      | 0      | t3   |
| 5           | A      | 24 kb  | t2   |

Table 2's metadata entries may correspond to the states shown in Table 1. The offset at location 0 may be offset 0, the offset at 8 kb may be offset 1, the offset at 16 kb may be offset 2, and the offset at 24 kb may be offset 3. The subscript of each journal entries 310 also identifies the offset associated with that metadata entry.

Deduplicated storage may use metadata journal 306 and data journal 308 to synthesize initial backup snapshot 314. First, metadata journal 306 may be queried to identify the most recent data associated with each offset. Next, the data may be retrieved from journal data file 308 and synthesized into backup snapshot 314. In some examples, synthesizing the backup snapshot may include generating and/or copying pointers rather than copying entire data blocks. This could be, for example, using a product such as EMC® Data Domain® Boost™

For example, once the initial scan is complete, data journal 308 includes data A, B, B', C, A', and D'. A' and B' are the result of application I/Os occurring during the scan process, and therefore represent the present state of offsets 0 and 1. To generate backup snapshot 314, deduplicated storage may therefore retrieve A', B', C, and D' from the data journal 308 and synthesize them together.

Once initial backup snapshot 314 is synthesized, journal entries 310 and 312 may no longer be needed. In some examples, they may be removed from deduplicated storage 304 in order to conserve space. Alternatively, they may remain in the journals.

The systems and processes described in reference to FIG. 3 enable a system to generate an initial backup snapshot. Once the initial snapshot is generated, additional processes may enable continuous data protection and point-in-time recovery.

Referring to FIG. 4, an example of a process to generate an initial backup snapshot is a process 400, which includes processing blocks 401, 402, 404, 406, 408, 410, 412, 414 and 416. At block 401, sequential initialization I/Os are received from a scanned storage volume. These I/Os could be, for example, received at a data protection appliance, such as data protection appliance 300. In some examples, the initialization I/Os are read from the scanned storage volume by the data protection appliance.

At block 402, the initialization I/Os are streamed to a deduplicated storage. In an example, the deduplicated storage may be substantially similar to deduplicated storage 304. In some examples, the initialization I/Os are streamed to a data journal using a data stream, and to a metadata journal using a metadata stream. Each stream may be a file in the deduplicated storage. Additionally or alternatively, writes to the journal files may be performed through the EMC® Data Domain® Boost™ API or any other API.

At block 404, the initialization I/Os may be written to a journal on the deduplicated storage. This journal may be, for example, similar to metadata journal 306 and/or data journal 308. In an example, these journals may be in the same journal files. Alternatively, these may be separate files on the deduplicated storage system.

At block 406, application I/Os comprising writes to offsets on the scanned storage volume may be received. These application I/Os may also be received at a data protection appliance, such as data protection appliance 300.

At block 408, an offset associated with a specific application I/O is identified, and at block 410 it is determined whether the offset has already been streamed to the deduplicated storage.

This determination could be made on data protection appliance 300 using journal processor 302. If the offset has already been streamed, it must have already been scanned and included in an initialization I/O. If the offset has not been streamed, the storage volume scan may not have reached the offset on the storage volume.

At block 412, the application I/O is streamed to the deduplicated storage if its offset was included in a previously streamed initialization I/O. In an example, the application I/O is only streamed when its offset was included a previously streamed initialization I/O. Streaming the application I/O when its offset was included in a previous initialization I/O ensures that writes to the scanned volume are not missed during the initialization processes. In some examples, the application I/Os are streamed to a data journal using a data stream, and to a metadata journal using a metadata stream.

In an example, application I/Os are not streamed if they comprise writes to an offset that has not yet been scanned and streamed in an initialization I/O. This is because the data generated by the write will be included in the initialization I/O once the scan reaches that offset. This may reduce traffic between the data protection appliance and the deduplicated storage, and may reduce the workload on the deduplicated because the data will only be processed once.

At block 414, the application I/O is written to the journal. This journal may be the same journal as the initialization I/Os, or it may be a separate journal. In an example, the journal is data journal 308 and/or metadata journal 306.

At block 416, a backup snapshot is synthesized from the initialization I/Os and the application I/Os. This snapshot may be substantially similar to snapshot 314. In an example, the snapshot is synthesized by generating data pointers in a new file on the deduplicated storage. Additionally or alternatively, the pointers may be copied from the data journal. These pointers may point to the data referenced and/or included in the journal. Synthesizing the snapshot using pointers may improve performance, as the data may not need to be replicated.

FIG. 5 depicts an additional or alternative example for initializing a backup snapshot. The system shown in FIG. 5 may include data protection appliance 500, journal processor 502, and deduplicated storage 504. These elements may be substantially similar to those described in reference to FIG. 3.

Data protection appliance 500 may take a snapshot of a storage system and transmit that snapshot to deduplicated storage 504 for storage as a file. In an example, this is different than streaming initialization I/Os and synthesizing a snapshot from journal files.

Rather than generating the snapshot on the deduplicated storage, the backup snapshot is generated using the data protection appliance and transmitted to deduplicated storage to be stored as backup snapshot 514.

In an example, journal processor 502 may stream application I/Os to deduplicated storage, and those application I/Os may be stored in metadata journal 506 and data journal 508. Like the journals of FIG. 3, metadata journal 506 may include metadata journal entries 510, and data journal 508 may include data journal entries 512. These journals may be used to synthesize a second backup snapshot or enable point-in-time recovery, as described below.

The systems and processes described in reference to FIGS. 3 to 5 enable a system to generate an initial backup snapshot. Once the initial snapshot is generated, additional processes may enable continuous data protection and point-in-time recovery.

Figure 6:
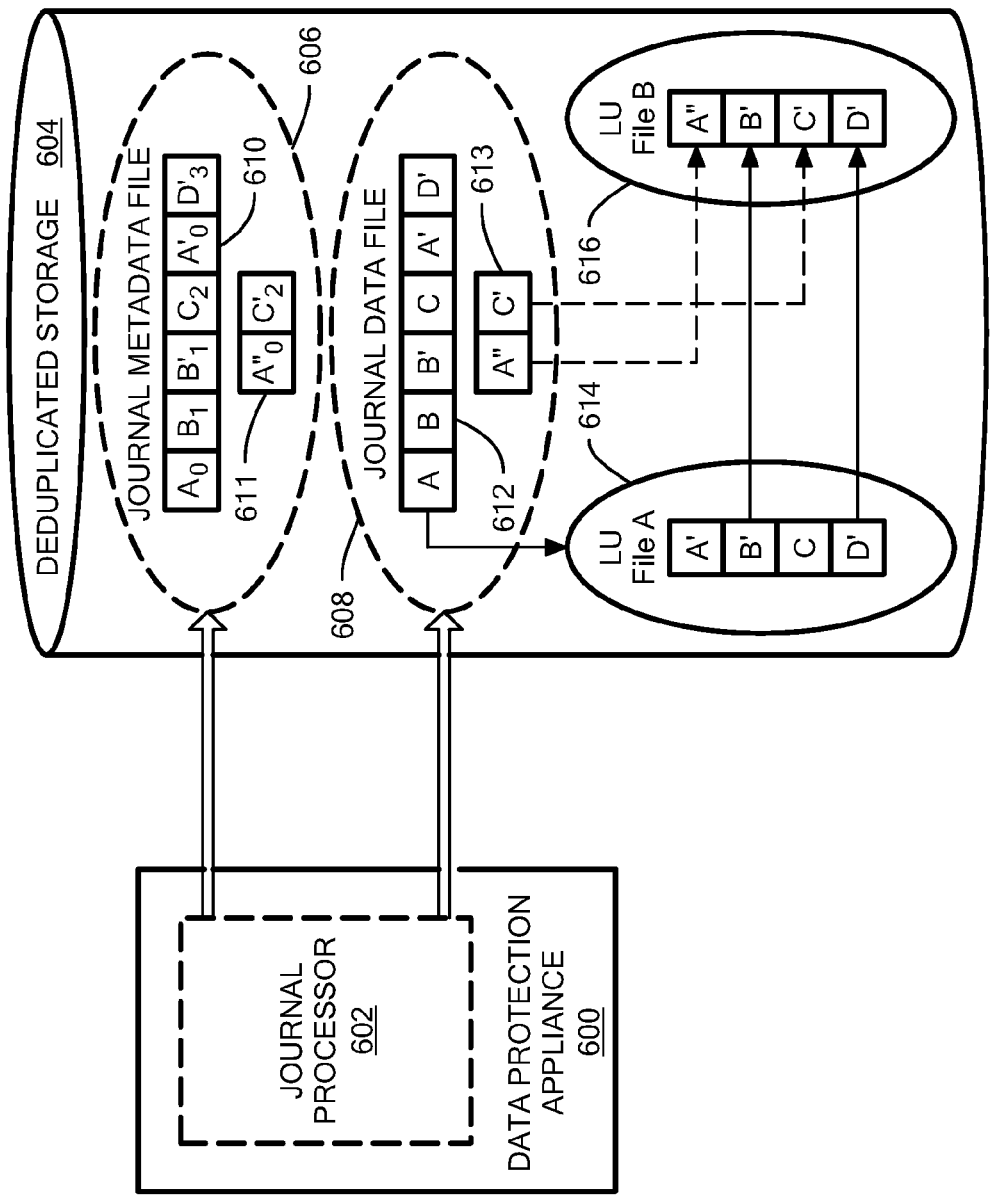
FIG. 6 is a block diagram of an example of a system to synthesize new backup snapshots.

Referring to FIG. 6, a system and process for maintaining backups using continuous data replication is described. As datasets increase in size, backing them up to remote or local backup devices becomes increasingly costly and complex. Additionally, traditional backup processes may not allow point-in-time recovery since the backups occur on a periodic, rather than continuous, basis. The methods and systems described herein provide continuous backup protection as writes are made to a source device, thereby reducing backup cost and complexity, and may allowing point-in-time recovery for backed up files.

The system of FIG. 6 includes a data protection appliance 600, a journal processor 602, and a deduplicated storage 604. These elements may be substantially similar to those described in reference to FIG. 3. Deduplicated storage 604 may include a backup snapshot 614, a metadata journal file 606, and a data journal file 608. In one example, backup snapshot file 614 is synthesized in a manner substantially similar to backup snapshot 314, and may be generated using metadata journal entries 610 and data journal entries 612.

As users, applications, and other processes access and use the source storage system, data on that system may change and/or new data may be generated. As a result, initial backup snapshot 614 may become stale. If the source storage system should fail, there is a chance that any new or modified data may be lost. To address this concern, data protection appliance 600 may receive and stream application I/Os to deduplicated storage system 604 on a continuous basis, even after initial backup snapshot 614 is synthesized. Streaming the application I/Os allows the backups on deduplicated storage 604 to remain up-to-date, without needing to perform additional backups of large datasets. This may reduce network traffic, reduce workloads, and conserve space on deduplicated storage 604.

For example, new metadata entries 611 and new data journal entries 613 represent I/Os made after initial backup snapshot 614 was synthesized. These entries may be written to metadata journal 606 and data journal 608, as shown in FIG. 6, or they may be written to separate journal files. In FIG. 6, data A' and C were modified on the source storage device, and the journal entries therefore include A" and C'.

Periodically, new backup snapshots may be synthesized from a previous backup snapshot and new journal entries. For example, second backup snapshot 616 may be synthesized from initial backup snapshot 614, new metadata journal entries 611, and new data journal entries 613. Second backup snapshot 616 may be used to restore source storage system up to the point-in-time the last journal entry was received. That is, backup snapshot 616 represents a backup of the source storage system at a later timestamp than initial backup snapshot 614.

In one example, synthesizing second backup journal entry 616 may be substantially similar to synthesizing the initial backup snapshot 614. Rather than synthesizing all of the data from data journal 608, however, unchanged data may be synthesized from initial backup snapshot 614. In one example, this synthesis may include copying and/or generating a data pointer. For example, in FIG. 6 the solid arrows between initial backup snapshot 614 and second backup snapshot 616 represent unchanged data that is common between the two. In this case, only B' and D' remain unchanged. The dashed arrows represent new or changed data that needs to be synthesized into second backup snapshot 616. In FIG. 6, A' is changed to A", C is change to C'. Synthesizing the data into second backup snapshot 616 therefore results in A", B', C', D'.

Additionally or alternatively, second backup snapshot 616 may be synthesized entirely from journal entries. Rather than synthesizing unchanged data from initial backup 614, deduplicated storage 604 may retrieve the unchanged data from data journal entries 612. For example, B' and D' may be synthesized from data journal entries 612 rather than from initial backup snapshot 614.

Additional backup snapshots, such as second backup snapshot 616, may be generated periodically or on demand. For example, a user policy may specify that new snapshots should be generated every week. Additionally or alternatively, a user may be preparing to perform some risky operations on the source storage system, and may demand that a snapshot be generated in case something goes wrong. These policies may be maintained and applied using data protection appliance 600, deduplicated storage 604, and/or an external system.

Figure 7:
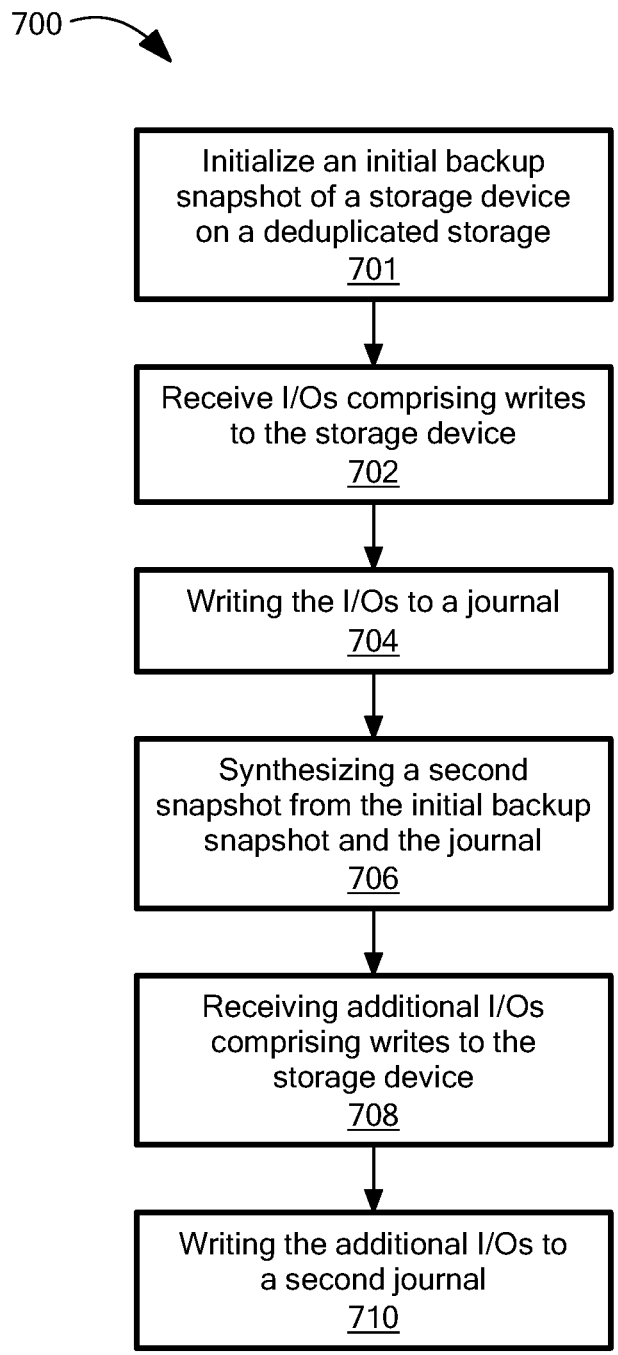
FIG. 7 is a flowchart of an example of a process to synthesize new backup snapshots.

Referring to FIG. 7, an example of a process to maintain backup snapshots using continuous data replication is a process 700, which includes processing blocks 701, 702, 704, 706, 708 and 710. At block 701, an initial snapshot of a source storage system may be generated. This initial snapshot may be substantially similar to initial backup snapshot 614, and may be generated using any one of the processes described in reference to FIGS. 3 to 5. Additionally or alternatively, the initial snapshot may be any previously generated snapshot. For example, the initial snapshot may be similar to second backup snapshot 616, and may be used in conjunction with journal files to generate a third backup snapshot.

At block 702, application I/Os comprising writes to the source storage system may be received. These writes may update existing data or generate new data. In some examples, the application I/Os may be received by a data protection appliance, such as data protection appliance 600.

At block 704, the application I/Os may be written to a journal file. This journal file may be substantially similar to metadata journal file 606 and/or data journal file 608. In some examples, the application I/Os may be written to one or more existing journals. Alternatively, application I/Os arriving after a snapshot is synthesized may be written to their own unique journals. This may be beneficial, for example, when maintaining different levels of backup granularity, as described below.

In some examples, the application I/Os are sequentially written to the journal as they are received. For example, if application I/Os arrive in order B, C, A, their corresponding entries in the journal will also be B, C, A.

At block 706, a second snapshot may be synthesized from the initial backup snapshot and the journal. The second snapshot may be substantially similar to second backup snapshot 616, and the synthesis process may be similar to that depicted by the solid and dashed lines. In some examples, the second snapshot may be synthesized entirely from journal files rather than use the initial backup snapshot.

During and/or after the synthesis process, additional application I/Os may be received at block 708. These application I/Os could be used, for example, to generate the third backup snapshot in the future, and may be processed in a manner similar to all the other application I/Os described herein.

At block 710 the additional application I/Os may be written to a journal file. They may be written to the same journal as the previous I/Os, or they may be written to a new journal file.

Figure 7A:
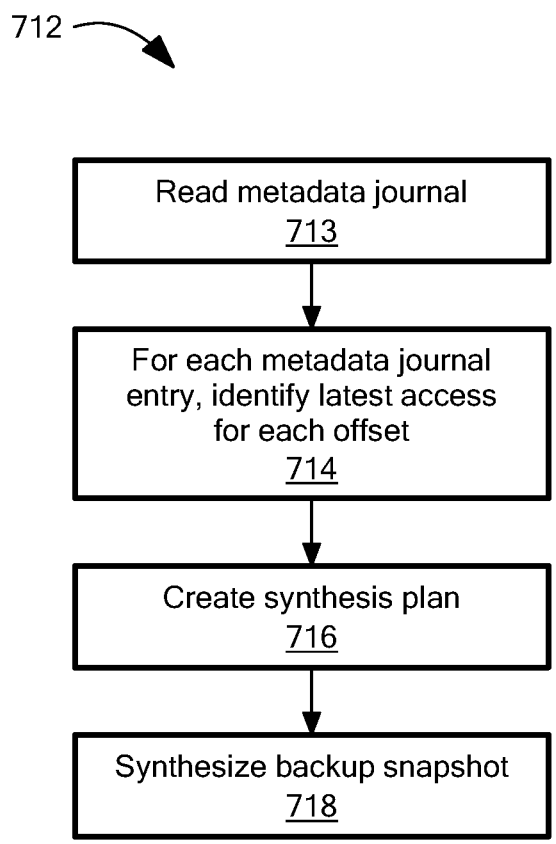
FIG. 7A is a flowchart of an example, of a process to generate a synthesis plan.

Referring to FIG. 7A, an example of a process to synthesize snapshots used for continuous data replication is a process 712, which includes processing blocks 713, 714, 716 and 718. At block 712, a metadata journal may be read. This metadata journal could be, for example, metadata journal file 606. In some examples, the metadata journal may be read using a journal processor on a data protection appliance. Additionally or alternatively, the read operation may be local to the deduplicated storage device.

At block 714, the latest I/Os for each offset may be identified. For example, metadata journal file 606 includes journal entries 610 and 611. The latest entry for offset 0 is A", 1 is B', 2 is C', and 3 is D'. In some examples, journal entries 610 and 611 may be written to different journals. In such some examples, the only I/Os identified would be A" and C' since we are synthesizing a snapshot from initial backup snapshot 614.

At block 716, a synthesis plan may be generated. This plan may identify where each I/O should be synthesized from. For example, the synthesis plan may only identify A" and C' for synthesis from data journal 608. The B' and D', in contrast, may be obtained from initial backup snapshot 614 since they have not changed.

At block 718, the backup snapshot may be synthesized. This backup snapshot could be, for example, substantially similar to backup snapshot 616.

The system and processes described herein may enable additional backup snapshots to be synthesized from journal entries and existing snapshots. In some examples, the journal entries may be application I/Os which are continuously streamed to a data protection appliance. While these snapshots may provide additional data protection, they may only allow data that exists in the snapshots to be recovered. Combining snapshots and journal files may, however, allow any point-in-time recovery.

When datasets are backed-up on a periodic rather than continuous basis, data recovery may only be available for specific time intervals. For example, if a dataset is backed up at the end of every business day, the only data that is available for recovery is the data as it exists at the end of the day. Continuous backups, however, may allow recovery of data at any, or nearly any, point-in-time. By transmitting application I/Os to a backup location as they occur, an interim snapshot may be synthesized between scheduled snapshots and data may be recovered.

Figure 8:
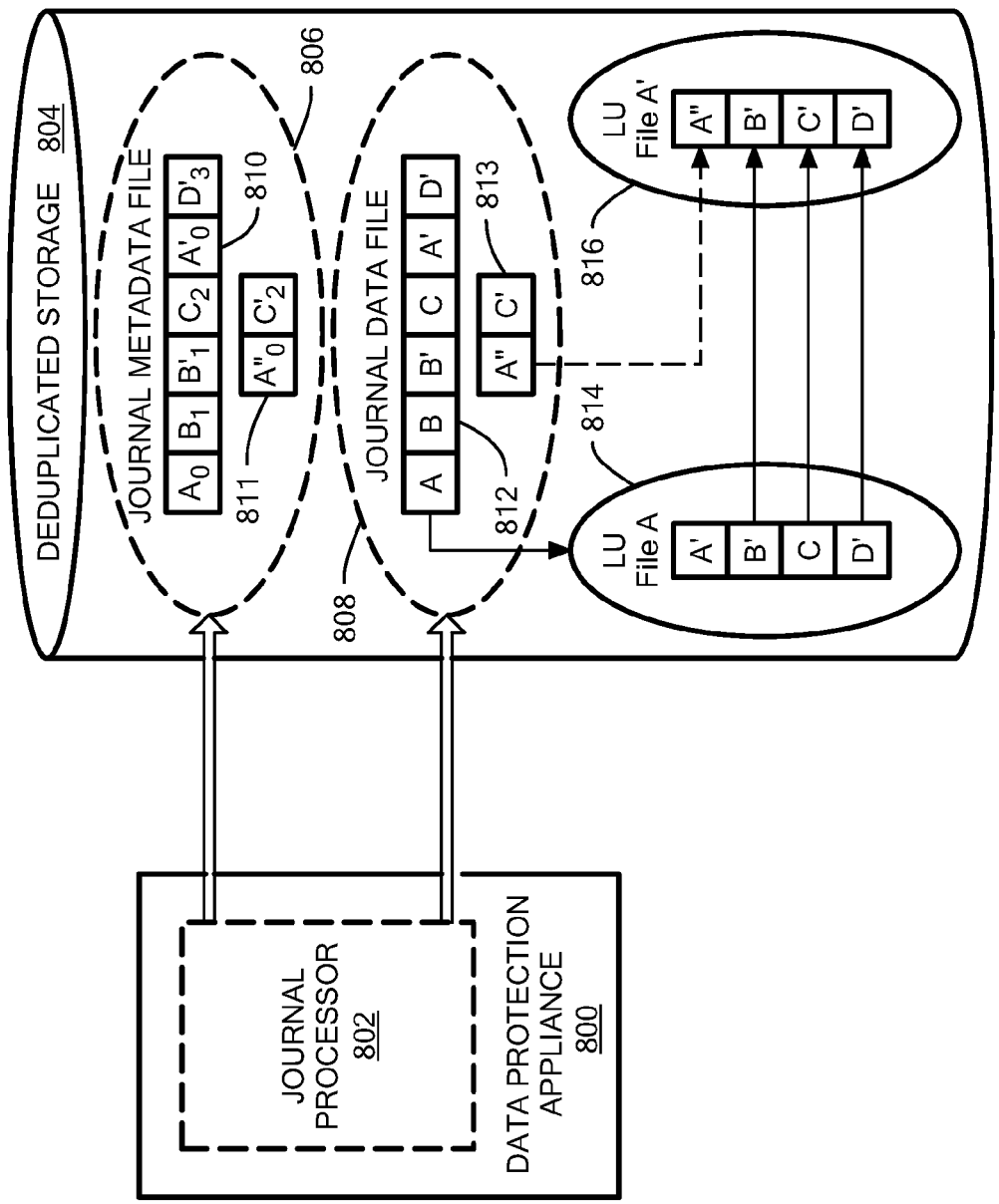
FIG. 8 is a block diagram of an example of a system to recover point-in-time data.
Figure 9:
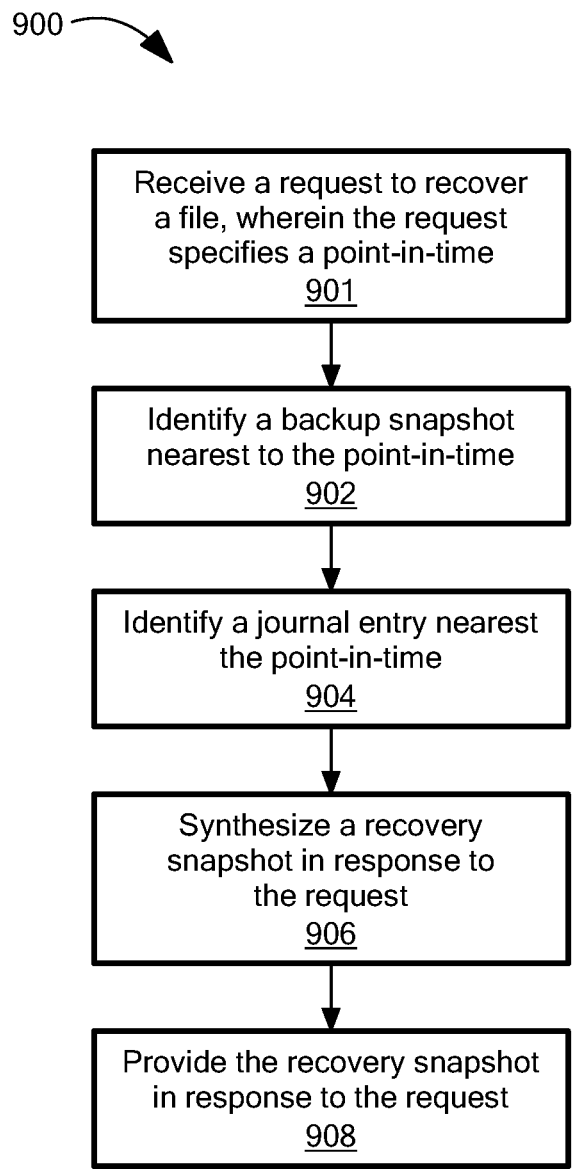
FIG. 9 is a flowchart of an example, of a process to recover point-in-time data.

FIGS. 8 and 9 depict a system and process to synthesize an interim snapshot for point-in-time recovery. In one example, the system may include data protection appliance 800, journal processor 802, and deduplicated storage 804. The system may also include metadata journal file 806, comprising metadata journal entries 810 and 811, and data journal file 808, comprising data journal entries 812 and 813.

Data protection appliance 800 may receive application I/Os as they are made to a source storage system. In some examples, journal processor 802 may write those I/Os to metadata journal file 806 and data journal file 808. Initialization journal entries 810 and 812 may be used to synthesize initial backup snapshot 814. Metadata entries 811 and data journal file entries 813 may be application I/Os made to the source storage volume after or while initial backup snapshot 814 was synthesized. These elements may be substantially similar to those described in reference to FIG. 6.

In one example, metadata journal entries 811 and data journal entries 813 may be used to synthesize interim snapshot 816. Interim snapshot 816 may then be used as a source for point-in-time recovery. For example, application I/Os A" and C' may be streamed to deduplicated storage as they are made to the source storage system. A user may then decide they wish recover data from the point-in-time immediately after application I/O A" was streamed. When the user's request arrives, the most recent snapshot may be initial backup snapshot 814, which does not include A" or C'. To respond to the user's request, deduplicated storage 804 may synthesize interim snapshot 816. This snapshot may include unchanged data from initial backup snapshot 814, as shown by the solid black arrows, and application I/O A" synthesized from data journal file 808, as shown by the dashed arrow. Note that interim snapshot 816 does not include C'. This is because the user requested data recovery at a point-in-time before C' may made.

In one example, the data from interim snapshot 816 may be transmitted back to the source storage system and recovered. Additionally or alternatively, it may be exposed to a host as LUN, as described in reference to FIGS. 12 and 13. Interim snapshot 816 may be deleted after recovery, or may be retained. In some examples, if interim snapshot 816 is generated at a point-in-time sufficiently close to a scheduled synthesis time, the scheduled synthesis may be cancelled and interim snapshot 816 may be treated as second backup snapshot 616.

Referring to FIG. 9, an example of a process to perform recovery for a point-in-time is a process 900, which includes processing blocks 901, 902, 904, 906 and 908. At block 901, a request to recover some data is received. This request could be, for example, received at data protection appliance 800 and/or deduplicated data storage 804. In one example, the request may specify a file representing a LUN to recover, or it may be a request to recover an entire system. Additionally or alternatively, the request may specify a point-in-time for the recovery. The point-in-time may be a date, event, or any other mechanism to identify a specific time. In some examples, the point-in-time may be between snapshots.

At block 902, a snapshot nearest the point-in-time may be identified. The snapshot could be, for example, initial backup snapshot 814.

At block 906, a recovery snapshot may be synthesized. This recovery snapshot could be, for example, substantially similar to interim snapshot 816. If the recovery snapshot is synthesized using a snapshot from an earlier point-in-time, I/Os stored in a journal file may be applied to synthesize the recovery snapshot.

At block 908 the recovery snapshot may be provided in response to the request. For example, the recovery snapshot may be exposed as a LUN and mounted on a host computer, or exposed as a network file system share. Additionally or alternatively, the recovery snapshot may be transmitted back to the source storage system. In some examples, only a portion of the snapshot, such as a specific file, may be provided.

Combining backup snapshots, journals, and continuous data replication may provide point-in-time recovery capabilities. As more data is written to and/or modified on a source storage system, however, the number of journals and snapshots may increase. In some examples, data protection windows may be used to manage this data growth.

As the number of snapshots and journals on the deduplicated storage grows, more space may be required. Deleting snapshots and journals may result in important information being lost, and adding to space to the deduplicated storage may be expensive. To address these concerns, backup windows and policies may be defined. Backup windows may be defined intervals designating which snapshot and journals should be stored, and for how long.

Figure 10:
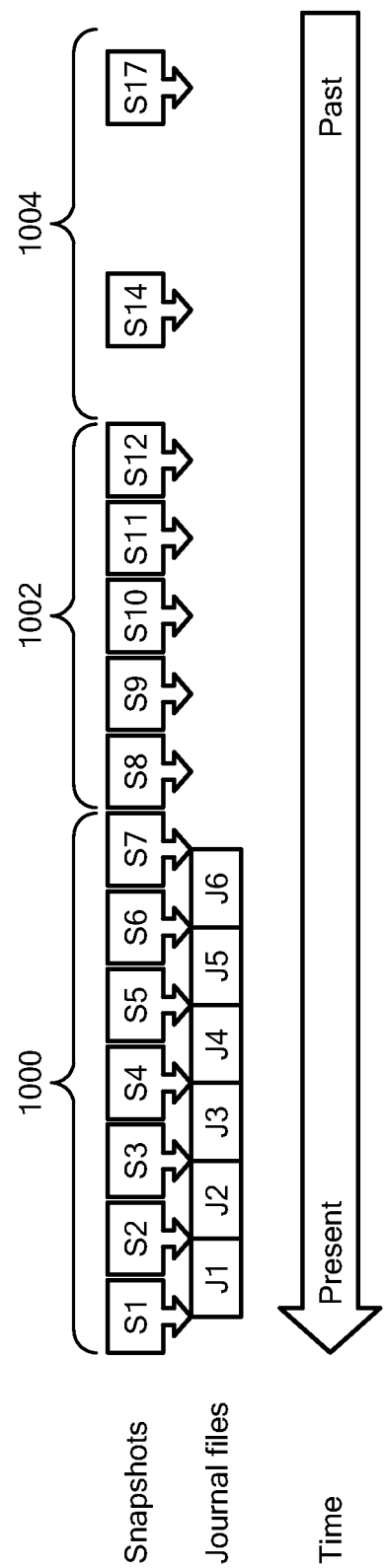
FIG. 10 is a simplified diagram depicting data protection windows providing backup granularity.

FIG. 10 depicts a system and process to define backup granularity using data protection windows. FIG. 10 shows seventeen snapshot files, labeled S1 through S17, stored on a deduplicated storage device. These snapshots may be generated and maintained in a manner substantially similar to that described above. The deduplicated storage device may also include six journal files, labeled J1 through J6, which may be used to synthesize new snapshots or perform point-in-time recovery.

FIG. 10 also includes three data protection windows: short-term protection window 1000, mid-term protection window 1002, and long term protection window 1004. Each of these protection windows may have an associated policy specifying actions to take on any snapshot and/or journal file within the protection window. For example, one policy may be "delete all journals within this protection window." While the examples described herein address deletion and/or retention policies, any other policy which may be applied to the journals and/or snapshots is consistent with this disclosure.

Short-term protection window 1000 may be defined to protect both snapshots and journal files allowing for point-in-time recovery. This window may be particularly beneficial for snapshots that were generated recently and/or were generated on demand by a user. On demand generation may signify that the snapshot is more important than a scheduled snapshot because a user must go out of their way to generate it. Further, it may be more likely that a user needs to recover data which was modified or generated recently.

Mid-term protection window 1002 may include only snapshot files. As time progresses and journal files move from short-term protection window 1000 into mid-term protection window 1002, they may be deleted. While deleting journal files may prevent most point-in-time recovery, the snapshots may be maintained in mid-term protection window. As a result, some level of point-in-time recovery is preserved. Specifically, any data included in one of the maintained snapshots may be recovered. Mid-term protection window therefore balances storage needs with recovery needs.

As snapshots move from mid-term protection 1002 window into long-term protection window 1004, certain snapshots may be deleted. Point-in-time recovery may be less important for long-term backups because of their age. The deleted snapshots may be chosen based on a policy, such as size or a user assigned priority. Additionally or alternatively, they may be arbitrarily chosen (for example, only retaining every fifth snapshot).

In some examples, data protection windows may be defined and maintained using a data protection appliance, a deduplicated storage device, and/or an external system. For example, if the data protection window is defined using a deduplicated storage device, that device may delete the journals and/or snapshots as the move from one data protection window into another. In some examples, the data protection windows may change dynamically based on available space on the deduplicated storage device. For example, if there is a large amount of available space the short-term protection window may be very large, and/or the mid-term and long-term protection windows may not exist. Similarly, if there is not much available space the long-term protection window may be very long. In further examples the short term protection may not exist at all and the system may use snapshot shipping in order to generate mid- and long-term snapshots on the deduplicated storage device.

In some examples, a backup system has a limited amount of resources and the number of files or stream the system can manage is limited. In such examples, keeping a file open for each replicated volume is problematic, and thus multiplexing multiple volumes into one file may be required.

Figure 11:
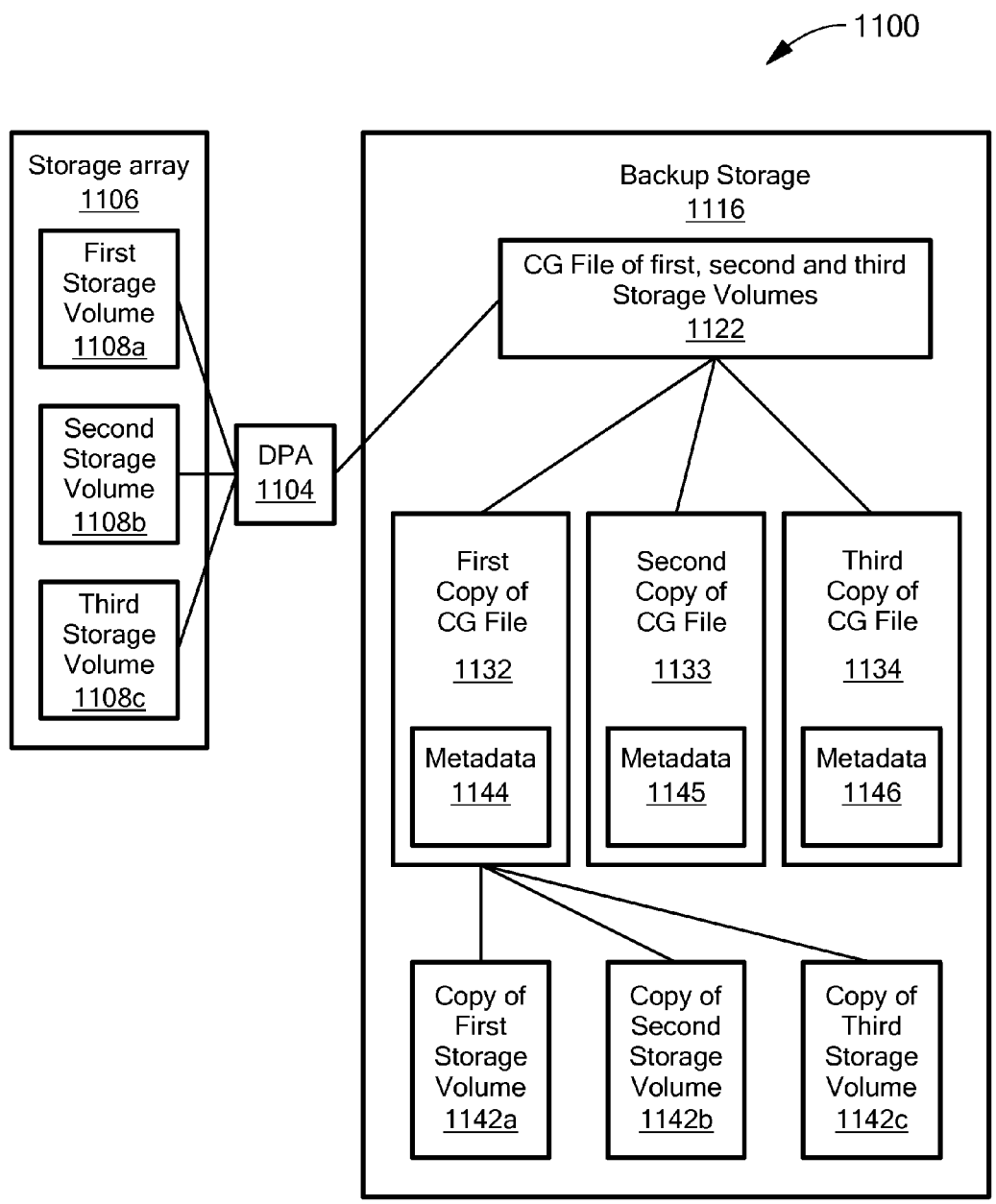
FIG. 11 is a block diagram of another example of a data protection system using volume multiplexing.

Referring to FIG. 11, an example of a data protection system that includes volume multiplexing is a data protection system 1100. The system 1100 includes a DPA 1104, a storage array 1106, a backup storage device 1116 (e.g., a deduplication device). The storage array 1106 includes a first storage volume 1108a, a second storage volume 1108b and a third storage volume 1108c.

The backup storage 1116 includes a consistency group (CG) file 1122, which is a single, concatenated, file that holds data for LUNs (volumes) in a given consistency group. For example, the CG file 1122 includes a replica of the first, second and third storage 1108a-1108c. The volumes 1108a-1108c are replicated to the CG file concurrently. Using this approach, resource requirements are reduced to a single write-stream per CG (rather than per replicated LUN (volume)) to the backup device 1116, which gives an order-of-magnitude reduction in the requirements. That is, volume multiplexing provides a better approach than copying a file for each volume, which would require a large number of open files when replicating, as each source LUN maps to a file. For example, thousands of LUNs being replicated concurrently would lead to thousands of write-streams to the backup device 1116, which typically exceeds the resource requirements of backup devices.

The backup storage 1116 may also include point-in-time (PIT) copies of the CG file 1122 (e.g., a first copy of the CG file 1132, a second copy of the CG file 1133 and a third copy of the CG file 1134). In one example, a PIT copy is generated periodically.

Each of the PIT copies 1132, 1133, 1134 includes metadata (e.g., the first copy of CG file 1132 includes metadata 1144, the second copy of CG file 1133 includes metadata 1145 and the third copy of CG file 1134 includes metadata 1146). In one example, each metadata 1144, 1145, 1146 includes a timestamp when the copy of the CG file was generated, a list of volumes that are included in the copy of the CG file and the sizes of the volumes.

As further described herein the copies 1132, 1133, 1134 may be used to extract copies of the first, second and third volumes 1108a-1108c (e.g., from the first copy of the CG File 1132, a copy of the first storage volume 1108a (i.e., volume 1142a may be extracted) as well as volumes 1142b, 1142c, which are copies of volume 1108b, 1108c respectively.

Figure 12:
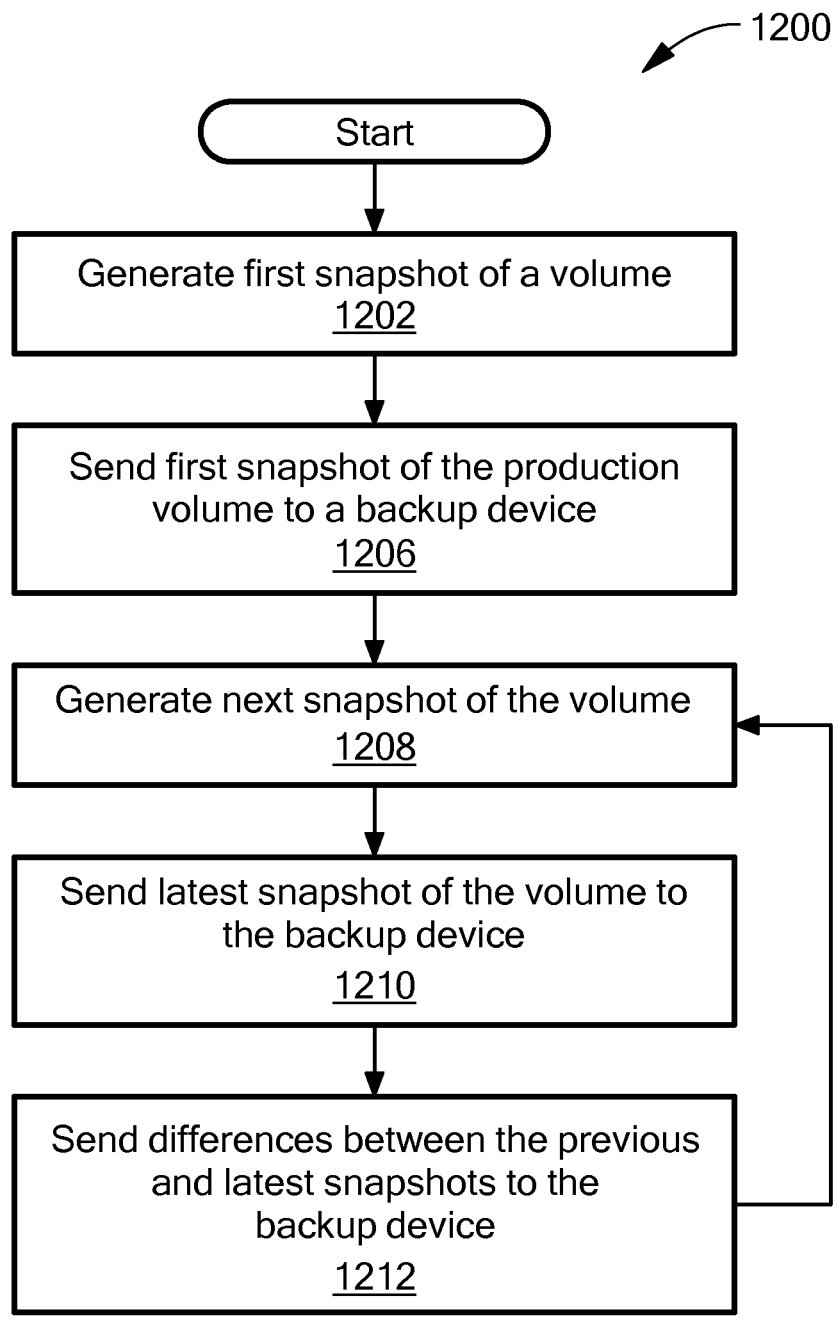
FIG. 12 is a flowchart of an example of a process to perform snapshot replication to a backup device.

Referring to FIG. 12, a process 1200 is an example of a process to perform snapshot replication to a backup device (e.g., the backup storage 1116). Process 1200 generates the first snapshot of a set of volumes (1202), sends the first snapshot to the backup device by writing the data to the CG file (1206) and generates a snapshot of the CG file (e.g., first copy of the CG file 1132) (1208). Process 1200 generates the next snapshot of the volumes (1210) and sends the differences between the previous and latest snapshot to the CG file (1212). Process 1200 generates a snapshot of the CG file (e.g., a second copy of the CG file 1133) (1214).

Figure 13A:
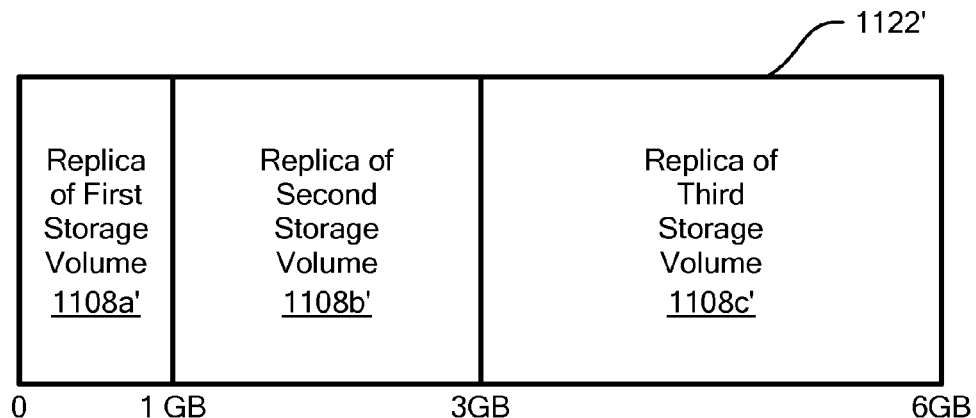
FIG. 13A is a block diagram of an example of a CG file.

Referring to FIG. 13A, an example of the CG file 1122 is the CG file 1122'. The CG file 1122 is a multiplexed file that includes concatenated versions of the volumes 1108a-1108c. In this example, the CG file 1122' includes replica of a first storage volume 1108a', a replica of the second storage volume 1108b' and a replica of third storage volume 1108c'. In this example, if the volumes 1108a-1108c have sizes of 1 GB, 2 GB and 3 GB respectively then the CG file 1122' will be 6 GB in size and the offset from 0 to 1 GB will be the first replica of the first volume 1108', the offset from 1 GB to 3 GB will be the replica of the second volume 1108b' and the offset from 3 GB to 6 GB will be the replica of the third volume 1108c'.

Figure 13B:
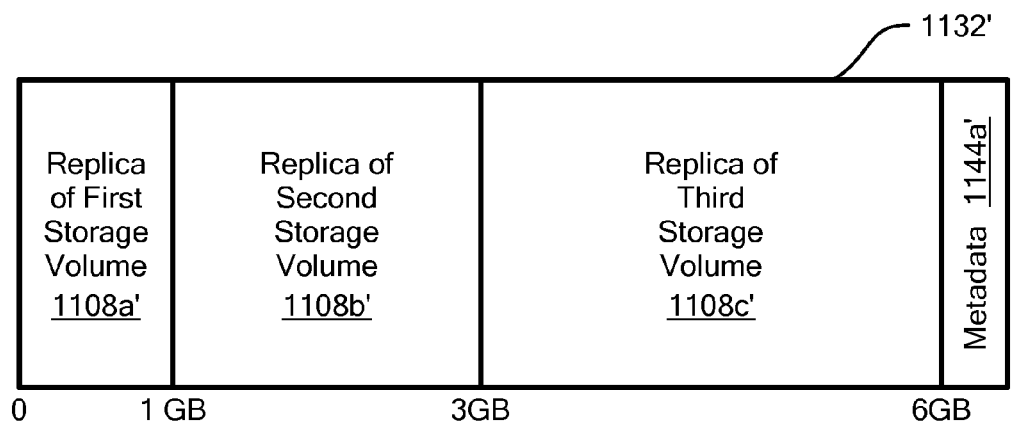
FIG. 13B is a block diagram of an example of a copy of a CG file at a point-in-time.
Figure 13C:
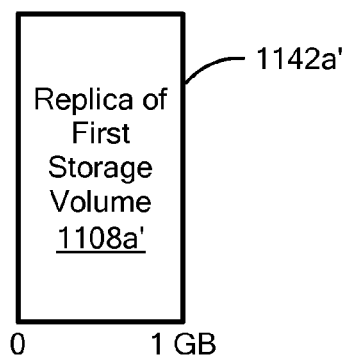
FIG. 13C is a block diagram of an example of a recovering a volume using the process of FIG. 15.
Figure 13D:
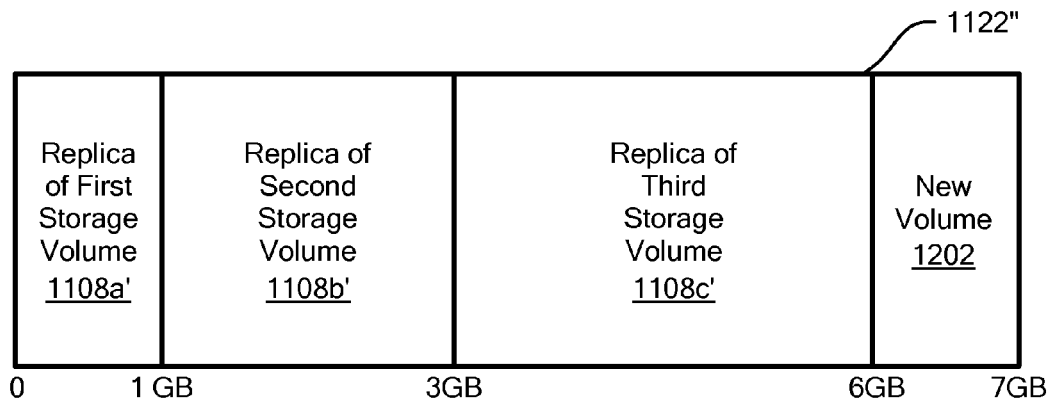
FIG. 13D is a block diagram of an example of a CG file after a new volume has been added using a process of FIG. 16.
Figure 13E:
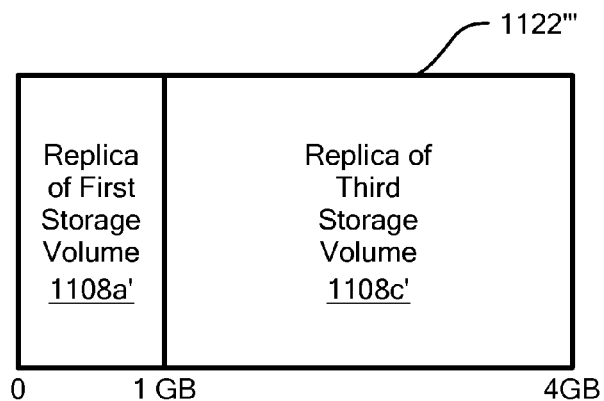
FIG. 13E is a block diagram of an example of a CG file after a volume has been deleted using a process of FIG. 17.
Figure 13F:
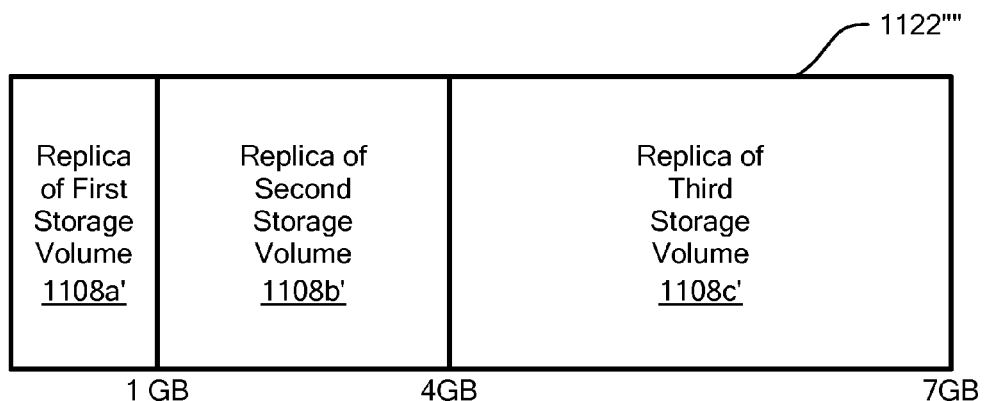
FIG. 13F is a block diagram of an example of a CG file after volume has been resized using a process of FIG. 18.

Referring to FIG. 13B, an example of a first copy of the CG file 1132 is a file 1132'. The file 1132' is a point-in-time copy of the CG file 1122' and includes metadata 1144', an example of metadata 1144.

Figure 14:
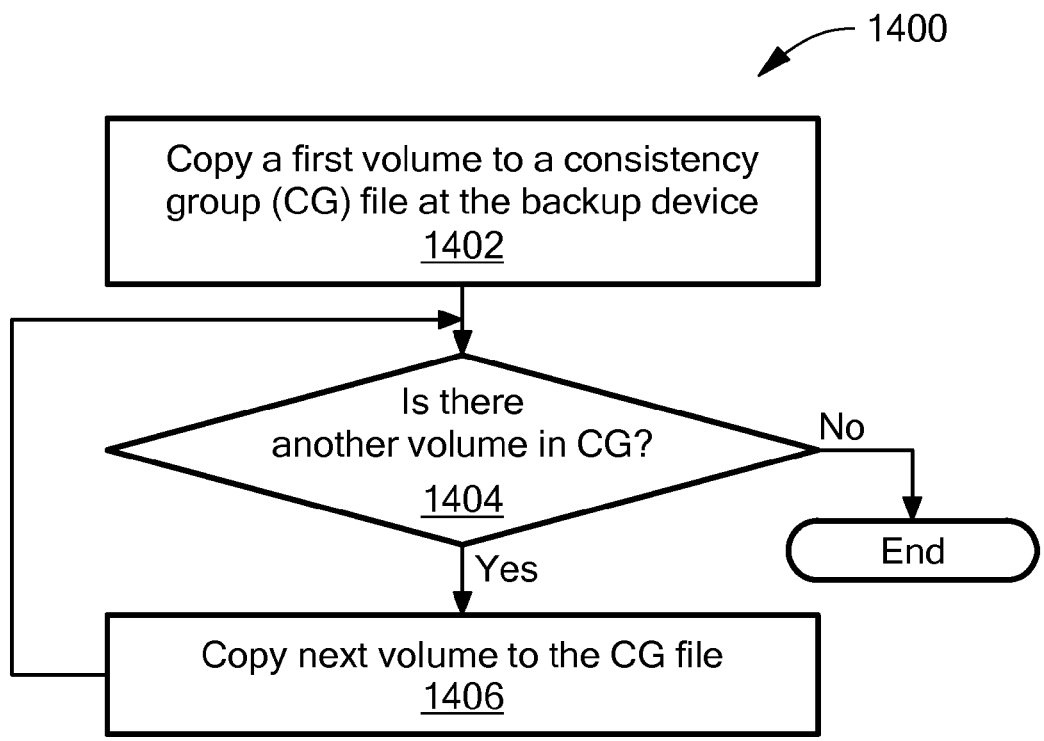
FIG. 14 is a flowchart of an example of a process to protect data using the data protection system of FIG. 11.

Referring to FIG. 14, a process 1400 is an example of a process to protect data using the data protection system 1100. Process 1400 copies a first volume to a consistency group file at the backup device (1402). For example, the DPA 1104 replicates the first storage volume 1108a to the CG file 1122.

Process 1400 determines if there are additional volumes to replicate and if there are, process 1400 copies the volumes to the CG file (1406). For example, the DPA 1104 replicates the second storage volume 1108*b* to the CG file 1122 and the DPA 1104 replicates the third storage volume 1108*c* to the CG file 1122.

Figure 15:
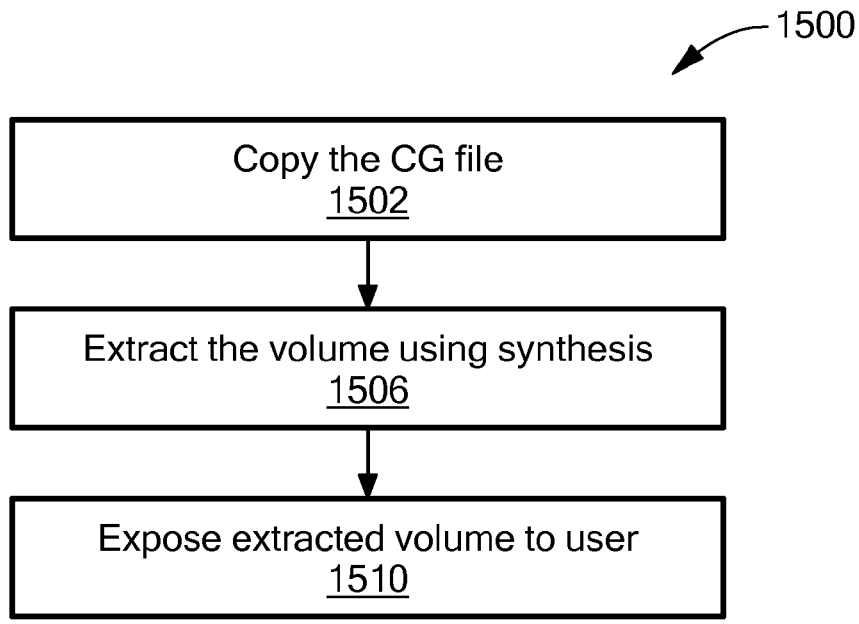
FIG. 15 is a flowchart of an example of a process to restore protected data from the data protection system of FIG. 11.

Referring to FIG. 15, a process 1500 is an example of a process to restore protected data. Process 1500 copies the CG file (1502). For example, the CG file 1122 is copied to become the first copy of CG File 1132 and the copy process, for example, is a fast copy doing a metadata operation only.

Process 1500 extracts a volume using synthesis (1506). For example, the process in FIG. 9 is used to extract a volume. In one particular example, to extract a replica of a first volume 1108*a'*, the process 900 in FIG. 9 is used to copy data from the 0 offset to the 1 GB offset to a new file 1142*a'* of size 1 GB (see FIG. 13C). In one example, the copy operation for extracting a volume from the CG file is a metadata operation and does not do any actual data copying and thus is very efficient.

Process 1500 exposes the extracted volume to the user (1510). For example the extracted volume is exposed as a logical unit for a user to access.

Figure 16:
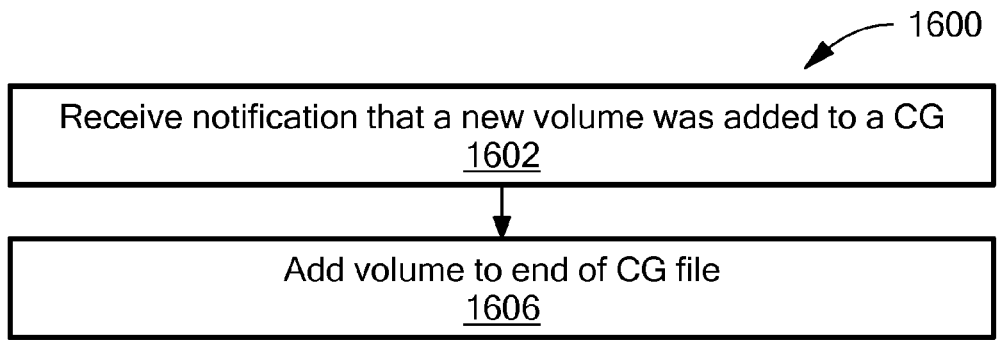
FIG. 16 is a flowchart of an example of a process to add a volume to a consistency group (CG) file in the data protection system of FIG. 11.

Referring to FIG. 16, a process 1600 is an example of a process to add a volume to a consistency group (CG) file. Process 1600 receives notification that a new volume was added (1602) and adds a volume to the end of the CG file (1606). For example, after a notification is received that a consistency group includes a new volume, the new volume is added to the end of the CG file 1122, i.e., the file size is increased and the last offset of the file are part of the new volume. For example, a CG file 1122" is formed by placing a new volume 1202 of size 1 GB at the end of the CG file 1122' (see FIG. 13D).

Figure 17:
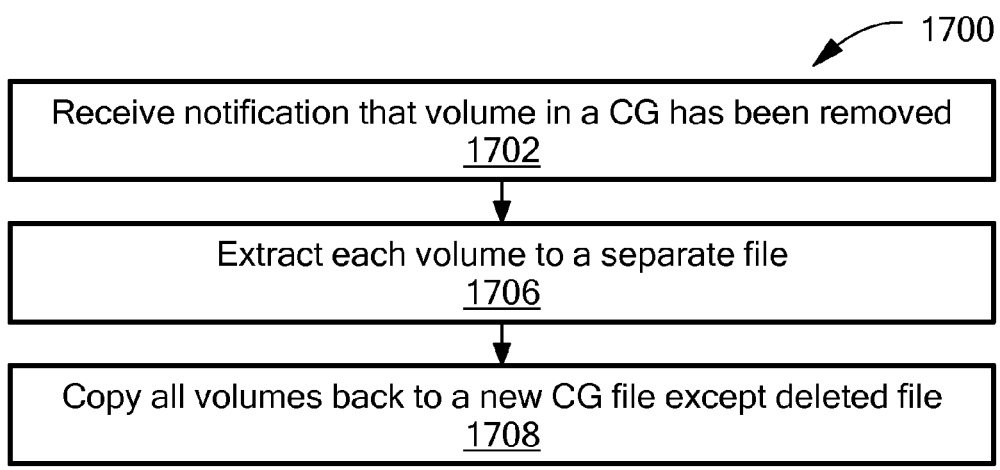
FIG. 17 is a flowchart of an example of a process to remove a volume from the CG file in the data protection system of FIG. 11.

Referring to FIG. 17, a process 1700 is an example of a process to remove a volume from the CG file. Process 1700 receives notification that a volume in a CG file has been removed (1702) and process 1700 extracts each volume to a separate file (1706) (e.g., using the synthesis process (e.g., the process 900 in FIG. 9)). For example, the copies of the files 1142*a*-1142*c* are generated (e.g., using the process 1400).

Process 1700 copies all the volumes back to a new CG file except the deleted volume (1708). For example, if the second storage volume is deleted then copies of the first and third volumes 1142*a*, 1142*c* are copied to a CG file 1122''' (see FIG. 13E).

Figure 18:
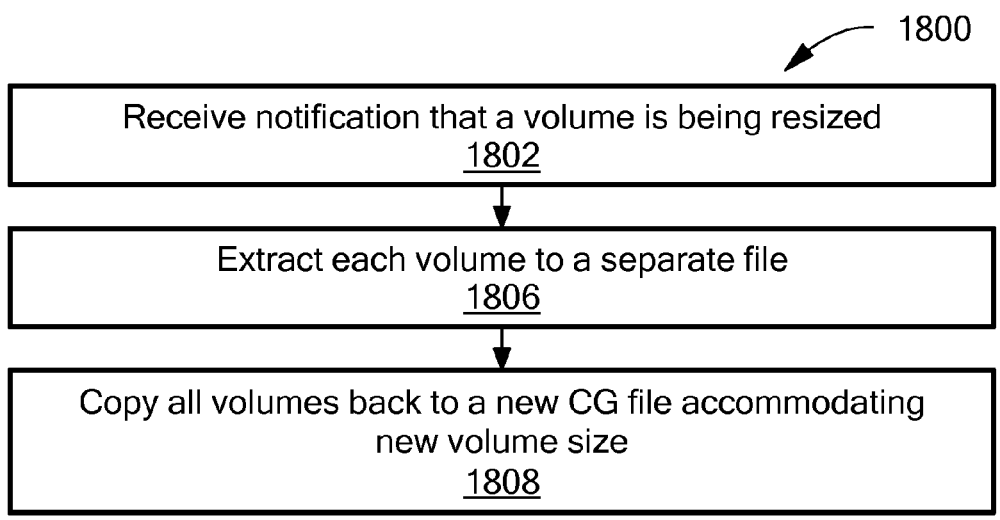
FIG. 18 is a flowchart of an example of a process to resize a volume and resize the CG file in the data protection system of FIG. 11.

Referring to FIG. 18, a process 1800 is an example of a process to resize a volume in the CG file in the data protection system of FIG. 11. Process 1800 receives notification that a volume is being resized (1802) and process 1800 extracts each volume to a separate file (1806) (e.g., using the synthesis process (e.g., the process 900 in FIG. 9)). For example, the copies of the files 1142*a*-1142*c* are generated (e.g., using the process 1400).

Process 1800 copies all the volumes back to a new CG file accommodating the new volume size (1808). For example, if the third storage volume is increased by 1 GB, then the first, second third volumes from copies 1142*a*-1142*c* are copied to a new CG file 1122"" (see FIG. 13F).

Figure 19:
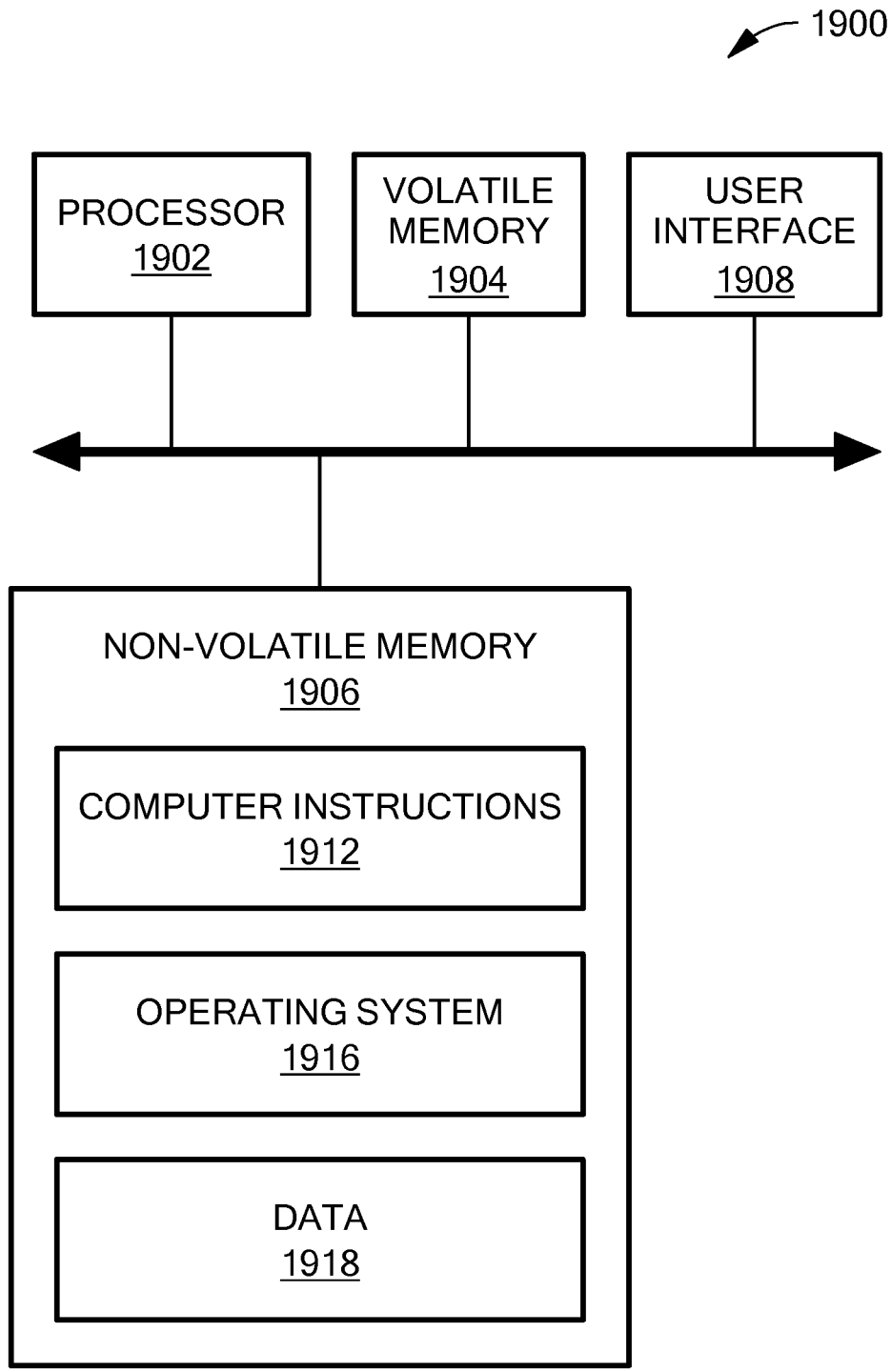
FIG. 19 is a simplified block diagram of an example of a computer on which any of the processes of FIGS. 4, 7, 7A, 9, 12 and 14 to 18 may be implemented.

Referring to FIG. 19, in one example, a computer 1900 includes a processor 1902, a volatile memory 1904, a non-volatile memory 1906 (e.g., hard disk) and the user interface (UI) 1908 (e.g., a graphical user interface, a mouse, a keyboard, a display, touch screen and so forth). The non-volatile memory 1906 stores computer instructions 1912, an operating system 1916 and data 1918. In one example, the computer instructions 1912 are executed by the processor 1902 out of volatile memory 1904 to perform all or part of the processes described herein (e.g., processes 400, 700, 712, 900, 1200, 1400, 1500, 1600, 1700 and 1800).

The processes described herein (e.g., processes 400, 700, 712, 900, 1200, 1400, 1500, 1600, 1700 and 1800) are not limited to use with the hardware and software of FIG. 19; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 400, 700, 712, 900, 1200, 1400, 1500, 1600, 1700 and 1800 are not limited to the specific processing order of FIGS. 4, 7, 7A, 9, 12 and 14 to 18, respectively. Rather, any of the processing blocks of FIGS. 4, 7, 7A, 9, 12 and 14 to 18 may be re-ordered, combined or removed, performed in parallel or in serial, as necessary, to achieve the results set forth above.

The processing blocks (for example, in the processes 400, 700, 712, 900, 1200, 1400, 1500, 1600, 1700 and 1800) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
   replicating a first volume to a consistency group (CG) file on a backup device;
   replicating a second volume to the CG file concurrently with the replicating of the first volume, the first and second volumes being in a consistency group; and
   adding a new volume to the CG file by adding the new volume to the end of the CG file in response to the new volume being added to the consistency group.

2. The method of claim 1, wherein the consistency group is a first consistency group and the CG file is a first CG file, and further comprising:
   replicating a third volume to a second CG file on the backup device; and
   replicating a fourth volume to the second CG file, the third and fourth volumes being in a second consistency group.

3. The method of claim 1, further comprising generating point-in-time copies of the CG file.

4. The method of claim 3, further comprising:
   receiving a request to restore the first volume at a first point-in-time;
   extracting the first volume from a point-in-time copy corresponding to the first point-in-time using a synthesis process; and
   exposing the extracted first volume as a logical unit to a user.

5. A method comprising:
   replicating a first volume to a consistency group (CG) file on a backup device; and
   replicating a second volume to the CG file concurrently with the replicating of the first volume, the first and second volumes being in a consistency group; and
   in response to a volume being deleted from the consistency group:
      extracting each volume in the CG file to a separate file; and
      copying volumes to a new CG file except the volume being deleted.

6. The method of claim 5, further comprising generating point-in-time copies of the CG file.

7. The method of claim 6, further comprising:
   receiving a request to restore the first volume at a first point-in-time;
   extracting the first volume from a point-in-time copy corresponding to the first point-in-time using a synthesis process; and
   exposing the extracted first volume as a logical unit to a user.

8. A method comprising:
   replicating a first volume to a consistency group (CG) file on a backup device; and
   replicating a second volume to the CG file concurrently with the replicating of the first volume, the first and second volumes being in a consistency group; and
   in response to resizing a volume in the consistency group:
      extracting each volume in the CG file to a separate file; and
      copying volumes to new CG file accommodating the resized volume.

9. The method of claim 8, further comprising generating point-in-time copies of the CG file.

10. An apparatus, comprising:
    electronic hardware circuitry configured to:
       replicate a first volume to a consistency group (CG) file on a backup device;
       replicate a second volume to the CG file concurrently with the replicating of the first volume, the first and second volumes being in a consistency group;
       in response to a volume being deleted from the consistency group:
          extract each volume in the CG file to a separate file; and
          copy volumes to a new CG file except the volume being deleted.

11. The apparatus of claim 10, wherein the circuitry comprises at least one of a processor, a memory, a programmable logic device or a logic gate.

12. The apparatus of claim 10, further comprising circuitry configured to add a new volume to the CG file by adding the new volume to the end of the CG file in response to the new volume being added to the consistency group.

13. The apparatus of claim 10, further comprising circuitry configured to, in response to resizing a volume in the consistency group:
    extract each volume in the CG file to a separate file; and
    copy volumes to new CG file accommodating the resized volume.

14. The apparatus of claim 10, further comprising circuitry configured to generate point-in-time copies of the CG file.

15. The apparatus of claim 14, further comprising circuitry configured to:
    receive a request to restore the first volume at a first point-in-time;
    extract the first volume from a point-in-time copy corresponding to the first point-in-time using a synthesis process; and
    expose the extracted first volume as a logical unit to a user.

16. An article comprising:
    a non-transitory computer-readable medium that stores computer-executable instructions, the instructions causing a machine to:
       replicate a first volume to a consistency group (CG) file on a backup device; and
       replicate a second volume to the CG file concurrently with the replicating of the first volume, the first and second volumes being in a consistency group;
       in response to resizing a volume in the consistency group:
       extract each volume in the CG file to a separate file; and
       copy volumes to new CG file accommodating the resized volume.

17. The article of claim 16, further comprising instructions causing the machine to add a new volume to the CG file by adding the new volume to the end of the CG file in response to the new volume being added to the consistency group.

18. The article of claim 16, further comprising instructions causing the machine to, in response to a volume being deleted from the consistency group:
    extract each volume in the CG file to a separate file; and
    copy volumes to a new CG file except the volume being deleted.

19. The article of claim 16, further comprising instructions causing the machine to generate point-in-time copies of the CG file.

20. The article of claim 19, further comprising instructions causing the machine to:
- receive a request to restore the first volume at a first point-in-time;
- extract the first volume from a point-in-time copy corresponding to the first point-in-time using a synthesis process; and
- expose the extracted first volume as a logical unit to a user.

* * * * *